US012067545B2

(12) United States Patent
Moskowitz et al.

(10) Patent No.: US 12,067,545 B2
(45) Date of Patent: Aug. 20, 2024

(54) REAL-TIME DIGITAL CASH MANAGEMENT SOLUTION

(71) Applicant: Mastercard International Incorporated, Purchase, NY (US)

(72) Inventors: Ellen Moskowitz, New Rochelle, NY (US); Sebastien Galperti, New York, NY (US); Chhomthyda Chhuan, Long Island City, NY (US); Sriram Iyer, Ardsley, NY (US); Patricia Ryan, Greenwich, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 18 days.

(21) Appl. No.: 17/967,000

(22) Filed: Oct. 17, 2022

(65) Prior Publication Data
US 2023/0033359 A1 Feb. 2, 2023

Related U.S. Application Data

(62) Division of application No. 16/511,890, filed on Jul. 15, 2019, now Pat. No. 11,481,743.

(51) Int. Cl.
*G06Q 20/14* (2012.01)
*G06F 16/2455* (2019.01)
(52) U.S. Cl.
CPC ......... *G06Q 20/14* (2013.01); *G06F 16/2455* (2019.01)
(58) Field of Classification Search
CPC .............. G06Q 20/14; G06F 16/2455
See application file for complete search history.

(56) References Cited

U.S. PATENT DOCUMENTS

| 5,699,528 | A | 12/1997 | Hogan |
| 6,636,833 | B1 | 10/2003 | Flitcroft et al. |
| 7,136,835 | B1 | 11/2006 | Flitcroft et al. |
| 2009/0319421 | A1* | 12/2009 | Mathis ................ G06Q 20/102 705/40 |

(Continued)

OTHER PUBLICATIONS

Wikipedia ISO 20022, downloaded Nov. 1, 2018, 2 pages.

(Continued)

*Primary Examiner* — Bennett M Sigmond
*Assistant Examiner* — Marla Hudson
(74) *Attorney, Agent, or Firm* — Kristin Grant; Richard E. Stanley, Jr.; Grant Attorneys at Law

(57) ABSTRACT

A real-time electronic bill presentment and payment system of a bill presentment and payment system (BPPS) provider is exposed to at least one of a business financial institution and an accounting software provider via an API. The BPP provider facilitates the institution or software provider providing a real-time electronic bill presentment and payment mobile application to a business. The BPPS obtains, via the API, from the institution or software provider, registration information relevant to the business. The real-time system populates a biller directory database with the registration information. No action, other than the facilitating, is required by the BPPS provider for the institution or software provider to obtain the registration information. In some instances, provision is made for loss of connectivity between the institution or software provider and the business and/or for alerts to the business.

7 Claims, 25 Drawing Sheets

(56) References Cited

U.S. PATENT DOCUMENTS

| | | |
|---|---|---|
| 2010/0100480 A1 | 4/2010 | Altman et al. |
| 2011/0137797 A1* | 6/2011 | Stals ................. G06Q 20/20 |
| | | 705/44 |
| 2011/0251952 A1 | 10/2011 | Kelly et al. |
| 2012/0197788 A1 | 8/2012 | Sanghvi et al. |
| 2013/0290177 A1 | 10/2013 | Milam et al. |
| 2013/0311362 A1 | 11/2013 | Milam et al. |
| 2015/0066753 A1 | 3/2015 | Hall et al. |
| 2021/0019718 A1 | 1/2021 | Moskowitz et al. |

OTHER PUBLICATIONS

Welcome to the Engagement Bureau, Press Releases, Matercard Makes Paying Bills A Breeze with Bill Pay Exchange, 3 pages, downloaded from https://newsroom.mastercard.com/press-releases/mastercard-makes-paying-bills-a-breeze-with-bill-pay-exchange/ 3/.

The Clearing House Payments Company L.L.C., definition of RTP (Real Time Payments), 8 pages.

Real-Time Payments for Instant Money Transfer | Mastercard + Vocalink, MasterCard, 5 pages, downloaded Nov. 1, 2018, from https://www.mastercard.us/en-us/issuers/products-and-solutions/business-payments/real-time-payments.html.

* cited by examiner

REAL-TIME DIGITAL CASH MANAGEMENT SOLUTION

CROSS-REFERENCE TO RELATED APPLICATIONS

This patent application is a divisional of U.S. patent application Ser. No. 16/511,890, filed Jul. 15, 2019, entitled REAL-TIME DIGITAL CASH MANAGEMENT SOLUTION, the complete disclosure of which is expressly incorporated herein by reference in its entirety for all purposes.

FIELD OF THE INVENTION

The present invention relates generally to the electronic, computer, and networking arts, and, more particularly, to techniques which improve the performance of electronic networks implementing bill presentment, bill payment, and/or money transfer, and the like.

BACKGROUND OF THE INVENTION

Non-limiting examples of small businesses/micro businesses include tradespersons such as plumbers, landscapers, and the like; as well as small law firms, small accounting firms, and so on. Currently, about seventy percent of small businesses and microbusinesses do not use any kind of software to invoice their customers. About thirty percent of small businesses use software solutions such as Intuit's QuickBooks software (registered marks of Intuit Inc., Mountain View, CA, USA). In the use-of-software case, small businesses sign up with a provider for an accounting solution, which may also include an invoicing and payment solution. When the small business is ready to send an invoice to the customer, through the software, using the customer's e-mail address, the business clicks on "send" in the software user interface and an e-mail is sent to the customer with the invoice information and one or more links in the email that allow the customer to pay the small business. Current payment techniques include (a) ACH (automated clearing house)—the customer enters the small business' routing number and account number and money will be pulled from the customer's checking account; or (b) the customer clicks on a button in the software user interface that says "pay by card" and the card number and details are entered. In this latter case, the software provider acts as a master merchant and a card transaction is executed. In case (a), the small business typically receives the money in about five days; in case (b), typically in about two days. Furthermore, the small business generally has to pay significant fees, on the order of 250 basis points. In a few limited instances, online money transfers such as provided by PayPal Holdings, Inc., San Jose, CA, USA, are available.

As noted, about seventy percent of small businesses and microbusinesses do not use any kind of software to invoice their customers. They typically use paper invoices and are paid by cash, check, or techniques such as the Apple Pay mobile payment and digital wallet service available from Apple Inc., Cupertino, CA USA, or the Square Card Reader (Dongle) available from Square, Inc., San Francisco, CA, USA. Such techniques may be expensive.

Still another option involves the customer accessing his or her bank's bill pay web site and entering the name and address of, e.g., her or his certified public accountant (CPA), and hitting "pay." However, the customer's bank still ends up cutting a paper check at the back end.

Current techniques for paying small businesses/microbusinesses are inefficient.

SUMMARY OF THE INVENTION

Principles of the present invention provide a real-time digital cash management solution, which may be particularly well-suited for small- and/or micro-businesses. In one aspect, an exemplary method, according to an aspect of the invention, includes exposing a real-time electronic bill presentment and payment system of a bill presentment and payment system provider to at least one of a business financial institution and an accounting software provider via an application programming interface; the bill presentment and payment system provider facilitating the at least one of a business financial institution and an accounting software provider providing a real-time electronic bill presentment and payment mobile application to a business; the real-time electronic bill presentment and payment system obtaining, via the application programming interface, from the at least one of a business financial institution and an accounting software provider, registration information provided to the at least one of a business financial institution and an accounting software provider by the business via the real-time electronic bill presentment and payment mobile application; and the real-time electronic bill presentment and payment system populating a biller directory database in the real-time electronic bill presentment and payment system with the registration information provided to the at least one of a business financial institution and an accounting software provider by the business via the real-time electronic bill presentment and payment mobile application. No action, other than the facilitating, is required by the bill presentment and payment system provider for the at least one of a business financial institution and an accounting software provider to obtain the registration information from the business via the real-time electronic bill presentment and payment mobile application.

In another aspect, an exemplary apparatus includes a memory; at least one processor, coupled to the memory; and a non-transitory computer readable medium including computer executable instructions which when loaded into the memory configure the at least one processor to: instantiate a legacy bill presentment and payment system, a real-time platform, and an application programming interface. The legacy bill presentment and payment system and the real-time platform cooperatively form a real-time electronic bill presentment and payment system of a bill presentment and payment system provider. The at least one processor is further configured to expose the real-time electronic bill presentment and payment system of the bill presentment and payment system provider to at least one of a business financial institution and an accounting software provider via the application programming interface; facilitate the at least one of a business financial institution and an accounting software provider providing a real-time electronic bill presentment and payment mobile application to a business; obtain, via the application programming interface, from the at least one of a business financial institution and an accounting software provider, registration information provided to the at least one of a business financial institution and an accounting software provider by the business via the real-time electronic bill presentment and payment mobile application; and populate a biller directory database in the real-time electronic bill presentment and payment system with the registration information provided to the at least one of a business financial institution and an accounting software provider by the business via the real-time electronic bill presentment and payment mobile application. No action, other than the facilitating, is required by the bill presentment and payment system provider for the at least one of a business financial institution and an accounting software provider to obtain the registration information from the business via the real-time electronic bill presentment and payment mobile application.

In still another aspect, another exemplary method include at least one of a business financial institution and an accounting software provider accessing a real-time electronic bill presentment and payment system of a bill presentment and payment system provider via an application programming interface; the at least one of a business financial institution and an accounting software provider providing a real-time electronic bill presentment and payment mobile application to a business, based on input from the bill presentment and payment system provider; and the at least one of a business financial institution and an accounting software provider providing, to the real-time electronic bill presentment and payment system, via the application programming interface, registration information provided to the at least one of a business financial institution and an accounting software provider by the business via the real-time electronic bill presentment and payment mobile application, to enable the real-time electronic bill presentment and payment system to populate a biller directory database in the real-time electronic bill presentment and payment system with the registration information provided to the at least one of a business financial institution and an accounting software provider by the business via the real-time electronic bill presentment and payment mobile application. No action, other than the input, is required by the bill presentment and payment system provider for the at least one of a business financial institution and an accounting software provider to obtain the registration information from the business via the real-time electronic bill presentment and payment mobile application.

Aspects of the invention contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps (e.g., when instructions from a persistent storage device are loaded into the memory to configure the processor). Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, such as:
  increased computational efficiency in populating a biller directory database (via a software architecture which enables a non-managed self-service mechanism);
  invoice buffering on a business computing device, such as a mobile device, and/or consumer activity buffering on a consumer's computing device, such as a mobile device, in case of loss of network connectivity;
  a out-of-band alerts to a business regarding pertinent invoices.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
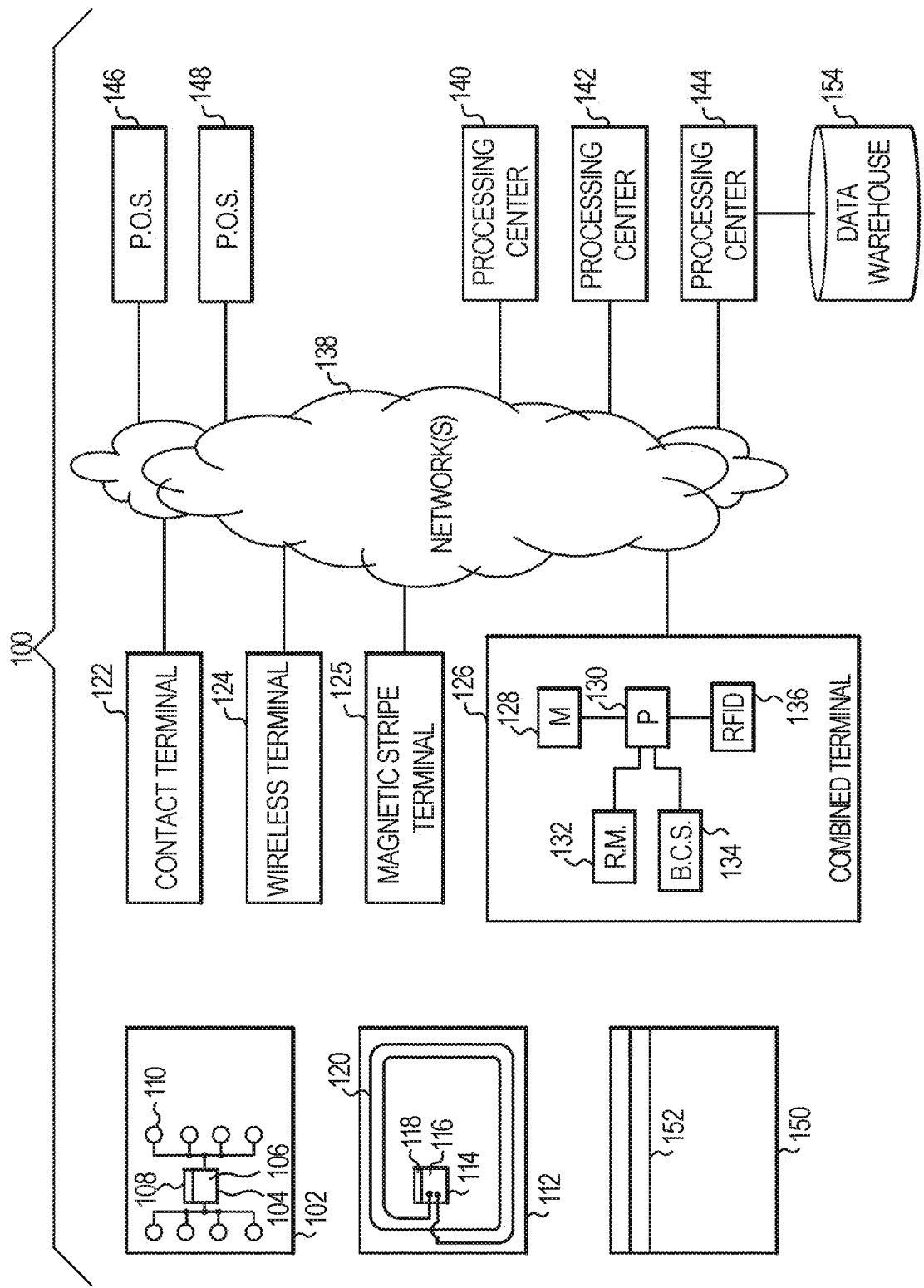
FIG. 1 shows an example of a system and various components thereof that can implement at least a portion of some techniques of the invention.

With regard to payment card and similar payments, attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional card 150 having a magnetic stripe 152. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom). Alternatively, JAVA CAR™-based operating systems, based on JAVA CARD™ technology (licensed by Sun Microsystems, Inc., 4150 Network Circle, Santa Clara, CA 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, CA, 94404, USA). It will be appreciated that applications can be configured in a variety of different ways.

The skilled artisan will also be familiar with the MAS-TERCARD® Contactless specifications (the skilled artisan will appreciate that MASTERCARD CONTACTLESS was formerly known as MASTERCARD PAYPASS), available under license from MASTERCARD International Incorporated of Purchase, NY, USA (marks of MASTERCARD International Incorporated of Purchase, NY, USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

For completeness, it should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
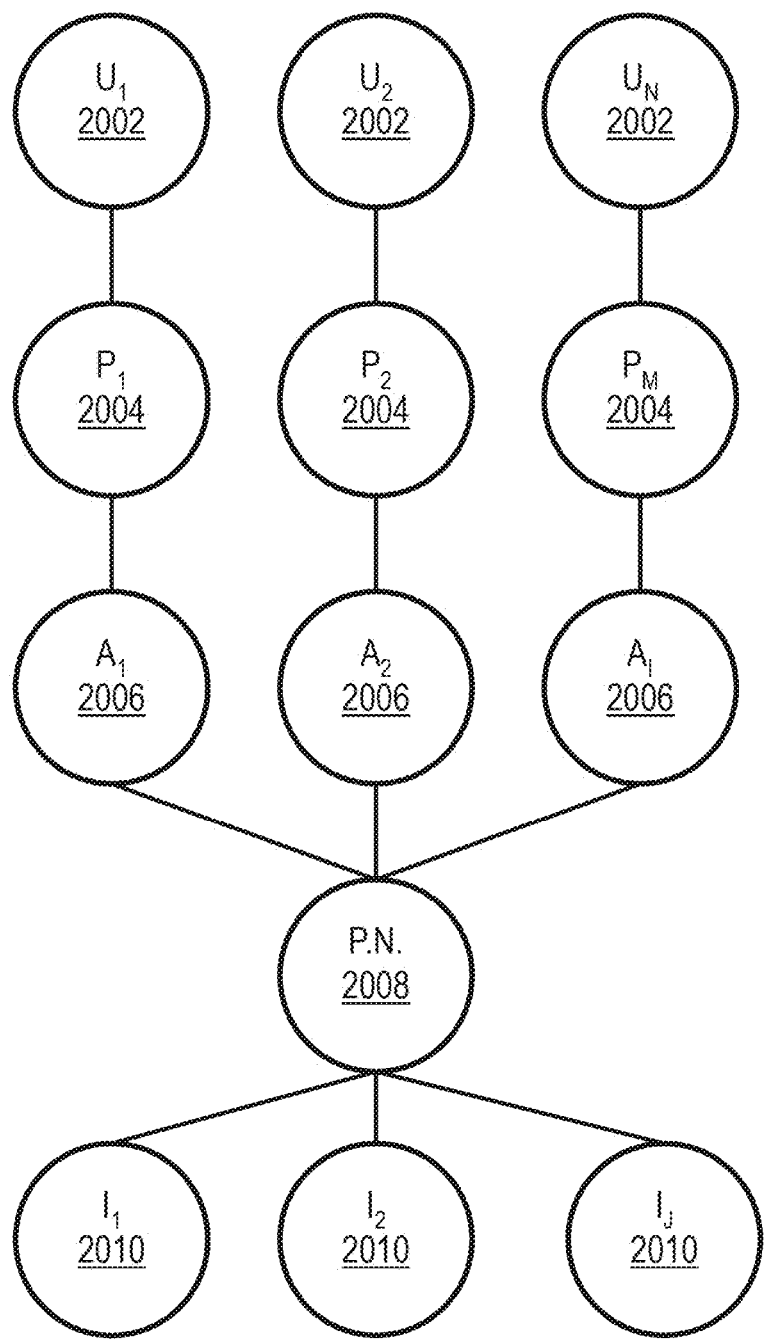
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the invention.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MASTERCARD International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed in relation to payment card accounts using other kinds of payment networks, for example, proprietary or closed payments networks with only a single issuer and acquirer. Furthermore in this regard, FIG. 2 depicts a four-party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Messages within a network such as network 138 and/or network 2008, may, in at least some instances, conform to the International Organization for Standardization (ISO) Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN) (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MASTERCARD International Incorporated of Purchase, New York, USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three-party model. Some payment card networks use ISO 8583 messaging. Non-limiting examples of payment card networks that connect multiple issuers with multiple acquirers are the BANKNET® network and the VISANET® network. One or more embodiments are applicable to many other different kinds of payment card networks as well; the AMERICAN EXPRESS® network and the DISCOVER® network are non-limiting examples.

Figure 6:
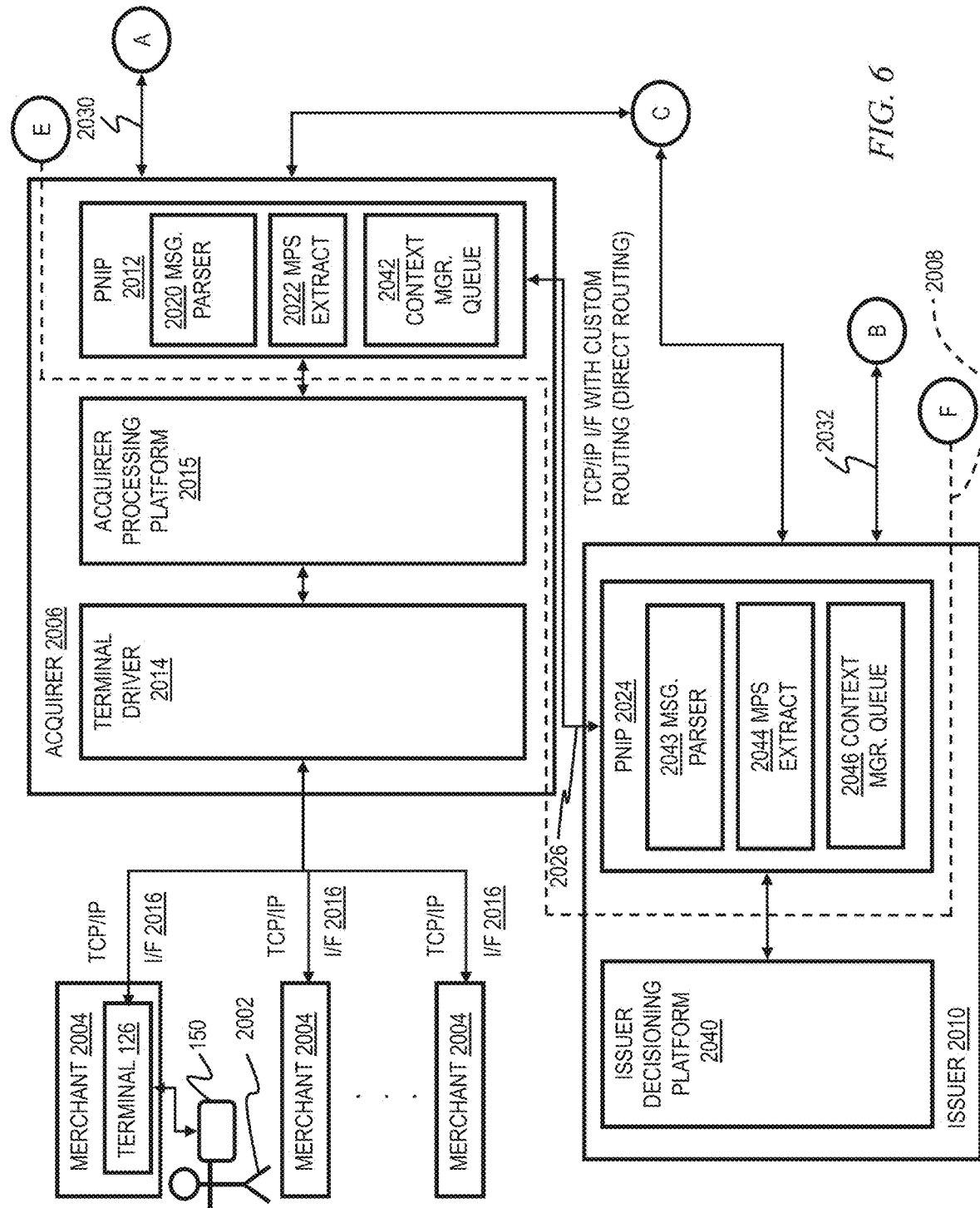
FIGS. 6 and 7 provide an exemplary detailed view of operation of a payment card network, in accordance with an aspect of the disclosure.
Figure 7:
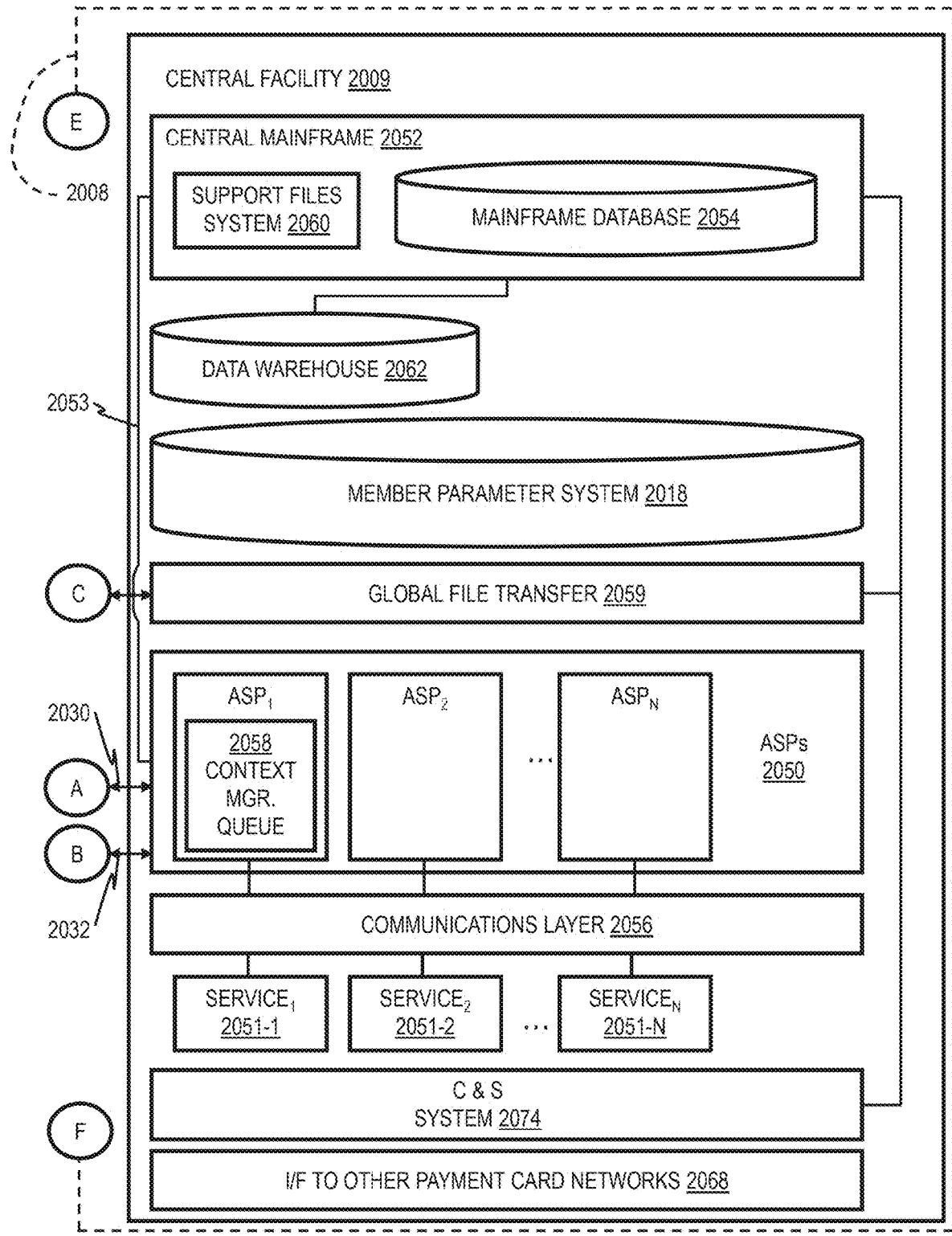

Still referring to FIG. 2, and with reference also now to FIGS. 6 and 7, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (for example, by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 6 and 7 encompasses the network 2008. Note generally that points A, B, C, E, and F in FIG. 6 connect to the corresponding points in FIG. 7; the entire network and associated environment are not amenable to illustration on a single sheet.

The acquirer 2006, in the more specific example of FIGS. 6 and 7, has at its premises a payment network interface processor (PNIP 2012). The MASTERCARD Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on its premises. Each acquirer 2006 will have a relationship with one or more merchants 2004 and will interface with the merchants' terminals 126 via terminal driver 2014 (an acquirer may also act as an acquirer for itself as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six-digit identification assigned by MASTERCARD for use by a member to uniquely identify activity the member is responsible for. A BIN or Bank Identification Number is a unique series of numbers assigned by MASTERCARD to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 (discussed elsewhere herein) configuration and transactions from that account range are then routed to the port from which the sign-in request is received. A member ID can be present on ports on multiple PNIPs at an Issuer site—see discussion of FIG. 9 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050 (discussed elsewhere herein), and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 8:
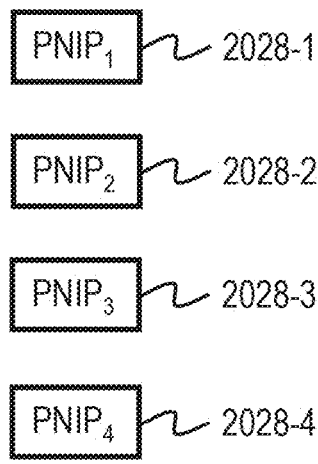
FIG. 8 shows a group of payment network interface processors, such as may be used with the network of FIGS. 6 and 7.
Figure 9:
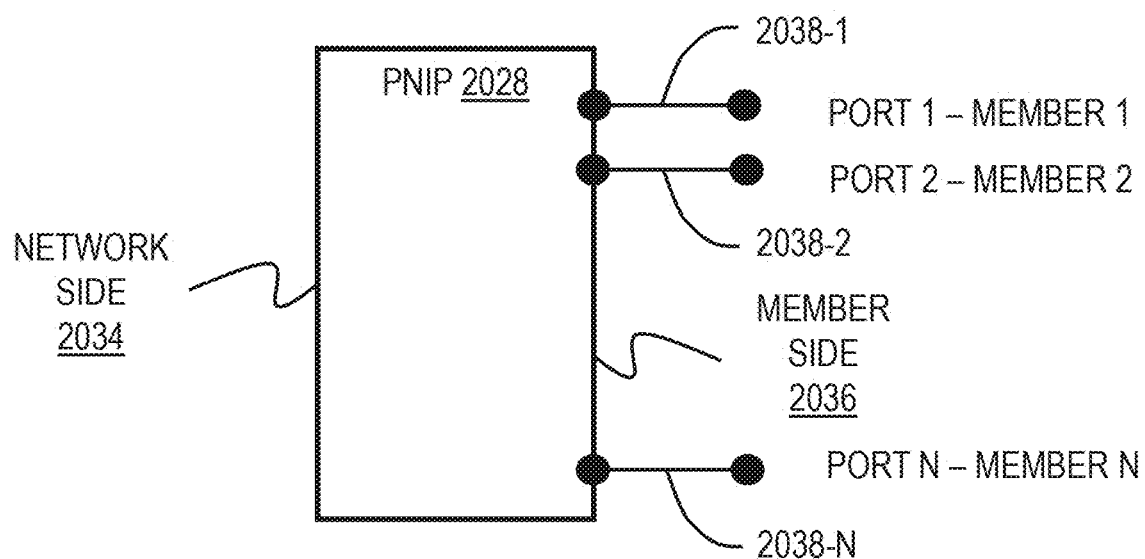
FIG. 9 shows a port arrangement on a payment network interface processor, such as may be used with the network of FIGS. 6 and 7.

FIG. 8 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 8 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 9 where a generalized PNIP 2028 has a network side 2034 and a member side 2036. Member side 2036 has N ports 2038-1 through 2038-N to members 1 to N. N is used herein as a generalized arbitrary integer and the value of N in FIG. 9 is not necessarily the same as that of N in connection with elements 2002 in FIG. 2, for example.

Figure 10:
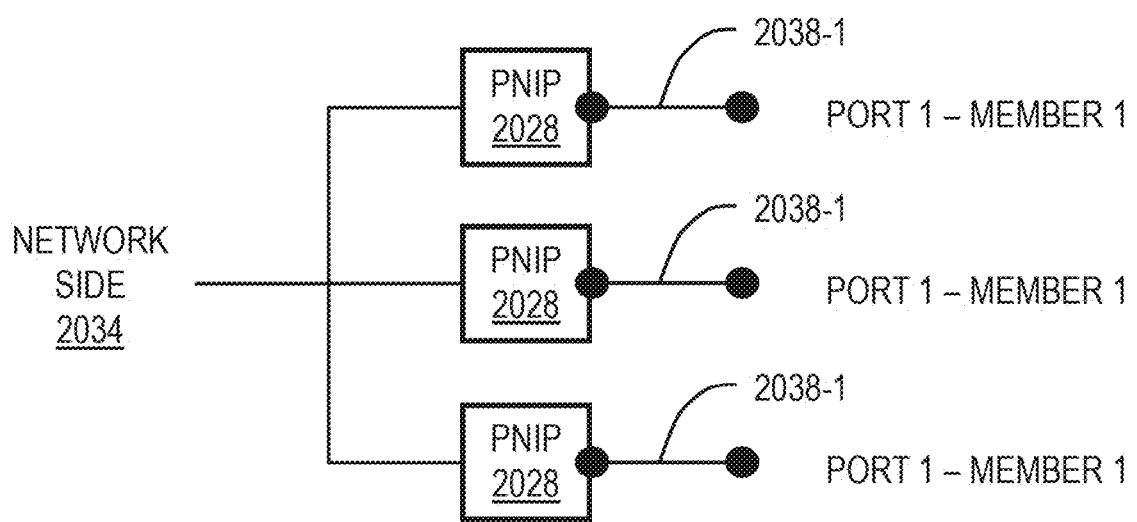
FIG. 10 shows a case wherein an issuer has multiple payment network interface processors.

As seen in FIG. 10, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 9). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 6 and 7 show "MPS extract" 2022, 2044; this will typically include the extract itself and the associated parameter file manager which manages obtaining the extracts from MPS 2018. Similarly, to reduce clutter, FIGS. 6 and 7 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 6 and 7 to avoid clutter.

Messages in case of Enhanced Services: In one or more instances, a special architecture is used to facilitate delivery of enhanced services (the ASP 2050 in FIGS. 6 and 7 is a non-limiting example). Examples of enhanced services include the MASTERCARD "inControl" product providing spending controls and/or virtual card numbers. Other examples are payment tokenization, loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transaction is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, TSP (MDES), payment card control and alerts service (MASTERCARD's IN CONTROL is a non-limiting example), Pay with Rewards, Installments and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, conventionally, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, MA US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

One or more embodiments are applicable to both "pull" and "push" payments; in some instances, a consumer can make a "push" payment using a mobile app. Thus, it is worth noting that, while payment card networks have generally been used as described with regard to FIGS. 1 and 2, recently, MASTERCARD MONEYSEND (mark of MASTERCARD International Incorporated, Purchase, New York, US) money transfer services have provided a new dimension. A funding transaction moves money from the sender (customer) to the Originating Institution (the financial institution providing the money transfer service); that transaction can be initiated through a MONEYSEND application program interface (API). The sender can fund the transaction using a MASTERCARD card account or other branded card account that the Originating Institution accepts; from a bank account; or with cash. A Payment Transaction transfers funds from the Originating Institution, via the MASTERCARD Network (e.g., BANKNET), to the payment card account identified by the recipient at the Receiving Institution. Funds can be transferred to a MASTERCARD® card, Debit MASTERCARD® card, and the like (marks of MASTERCARD International Incorporated, Purchase, New York, US). Such transactions are an example of what can be more generally referred to as special payment transactions.

Furthermore in this regard, a special payment transaction to put funds on to the card of the business (e.g. small business 9001 discussed elsewhere herein) includes, e.g., an ISO-8583 message type 0100 with transaction type twenty-eight, or an ISO-8583 message type 0200 with transaction type twenty-eight, such as the MasterCard MONEYSEND Payment Transaction. Several different non-limiting exemplary scenarios regarding special transactions such as the MasterCard payment transaction or MONEYSEND will now be presented. In one scenario, a dual message model is employed. An "auth request" is sent (ISO-8583 message 0100 with Transaction Type (DE3sf1)="28" (Payment Transaction)) from the buyer's (entity that acts as the buyer within this particular transaction) bank to the business' bank, over a payment card network (network 2008 is a non-limiting example). This guarantees the money transfer (reserves funds for the business). Subsequently (for example, in one day) a "First Presentment" message 1240 is sent in a bulk file which completes the transfer. In another scenario, a single message model is utilized. A Financial Transaction request is sent (ISO-8583 message 0200 with Transaction Type (DE3sf1)="28" (Payment Transaction)) from the buyer's (entity that acts as the buyer within this particular transaction) bank to the business' bank, over a payment card network (network 2008 is a non-limiting example). It is worth noting at this point that ISO 8583 message type 0100 is used in a conventional transaction as an authorization request from the acquirer 2006 to the issuer 2010 of the consumer's card, to which the issuer 2010 responds with an authorization request response 0110. The message type 0100 is also utilized conventionally for chargebacks and the like. The message type 0100 is utilized in a different way here based on a different code/transaction type than in the conventional applications (Transaction Type (DE3sf1)="28" (Payment Transaction)).

Electronic Bill Presentment and/or Payment Systems and Automated Clearing House (ACH) Payments The process of electronic bill presentment and payment has also been popular for quite some time. For example, U.S. Pat. No. 5,699,528 to Hogan, expressly incorporated herein by reference in its entirety for all purposes, discloses a system and method for bill delivery and payment over a communications network. In the bill delivery and payment system, users are able to access a server computer on a communications network to obtain bill information and pay bills.

Figure 3:
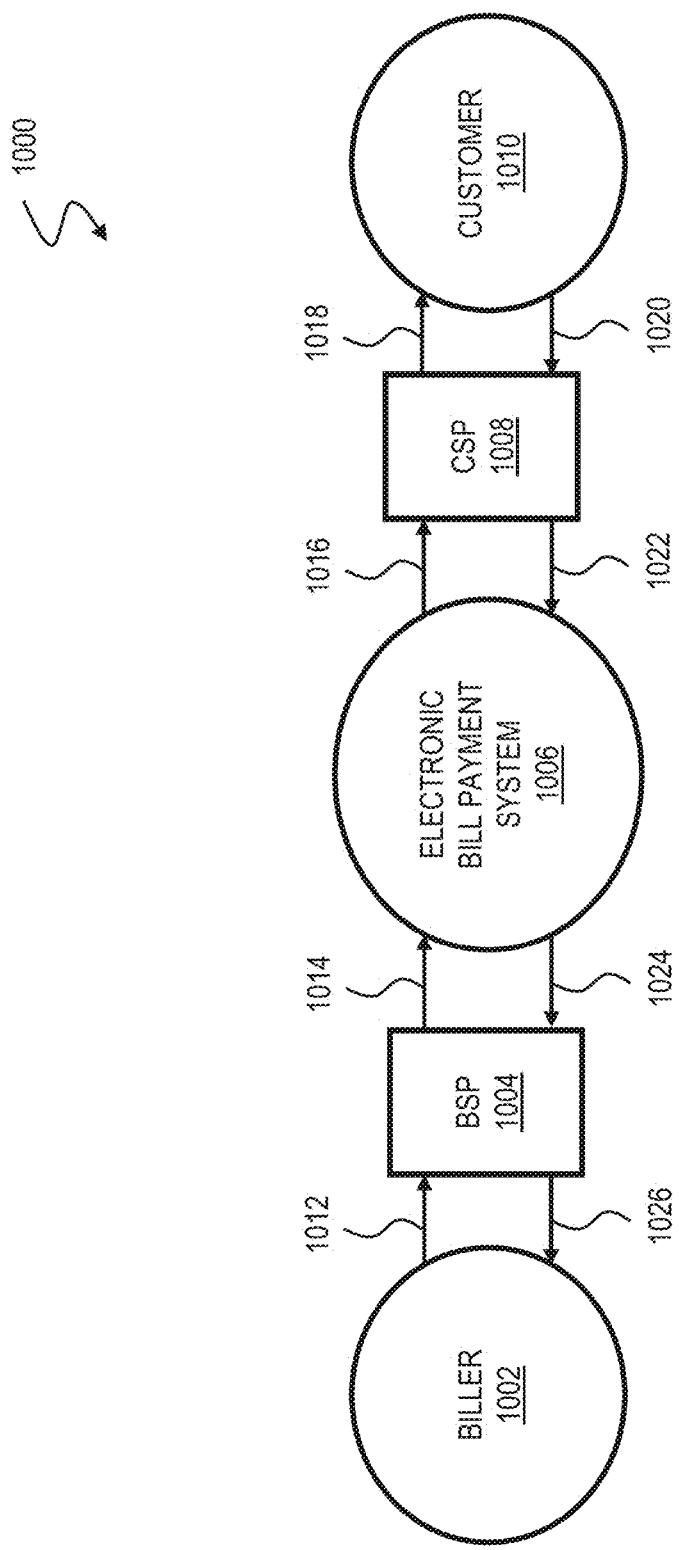
FIG. 3 shows exemplary operation of a bill pay system, as known from the prior art.
Figure 4:
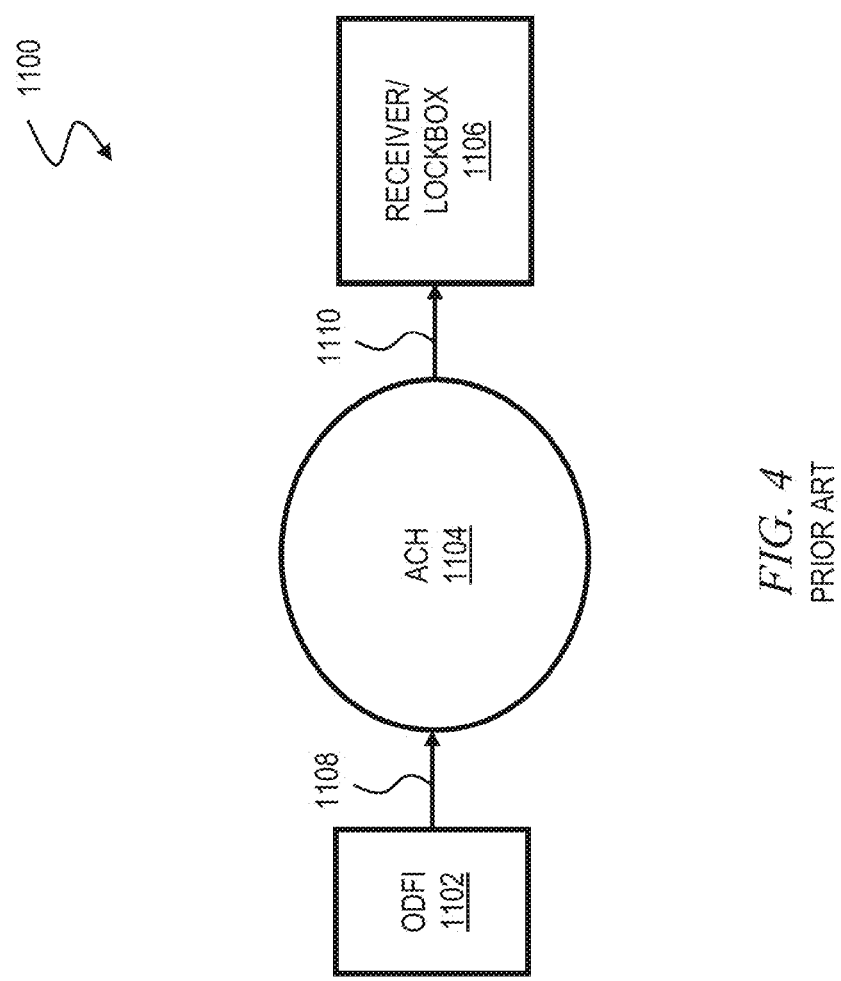
FIG. 4 shows exemplary operation of current automated clearinghouse payments.

Referring now to FIGS. 3 and 4, electronic bill payment systems are conceptually different than payment card networks, and will often use electronic funds transfer from a demand deposit account. In some instances, a single entity, such as MASTERCARD International Incorporated (a non-limiting example) will operate both a payment card network and an electronic bill payment system (optionally, with presentment functionality).

Electronic bill presentment and payment systems can be used in connection with some embodiments; one example is the MASTERCARD RPPS® electronic payment system of MASTERCARD International Incorporated of Purchase, New York, USA. This example is non-limiting; for example, other types of electronic bill presentment and/or payment systems could be employed in other instances. Non-limiting examples are described in:

US Patent Publication 2011-0251952 A1 of Mary L. Kelly et al., expressly incorporated herein by reference in its entirety for all purposes.

US Patent Publication 2012-0197788 A1 of Hemal Sanghvi et al., expressly incorporated herein by reference in its entirety for all purposes.

US Patent Publication 2013-0290177 A1 of Amy Christine Milam and Stephen Joseph Klaus, expressly incorporated herein by reference in its entirety for all purposes.

US Patent Publication 2013-0311362 A1 of Amy C. Milam et al., expressly incorporated herein by reference in its entirety for all purposes.

For the avoidance of doubt, references to "MASTERCARD," "an entity such as MASTERCARD International Incorporated," and the like, unless expressly stated to be limited to MASTERCARD, are intended to be exemplary of an operator of an electronic bill payment system (optionally, with presentment functionality), an operator of a payment card network, as will be appreciated by the skilled artisan from the context, whether or not qualified by words such as "or other operator."

Furthermore, another non-limiting example of an electronic bill presentment and/or payment system is the CHECKFREE platform available from Fiserv, Inc. of Brookfield, Wisconsin, USA. Other possibilities will also be apparent to the skilled artisan, given the teachings herein.

FIG. 3 shows operation of an electronic bill payment system, such as the MASTERCARD RPPS® electronic payment system, which is but one non-limiting example of such a system. As shown in FIG. 3, in an approach 1000, during a presentment phase, a biller 1002 electronically sends billing information 1012 to its biller service provider (BSP) 1004; that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Note that "BPPS" is used herein as shorthand for an electronic "bill presentment and payment system"; the MASTERCARD RPPS system is a non-limiting example of such a system.

Note that in some instances, billers 1002 can connect directly to BPPS 1006 without the use of BSP 1004. In such cases, billers 1002 exchange presentment and payment data directly with BPPS 1006.

FIG. 4 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; non-limiting examples of ACH file formats include the NACHA ACH CIE, NACHA ACH PPD, or NACHA ACH CCD (e.g. for corporate-to-corporate cases) file formats. Other formats can also be used; for example, extensible markup language (XML). It should be noted that a variety of networks can be used, both public (for example, ACH) and proprietary (for example, the aforementioned MASTERCARD RPPS system).

Figure 5:
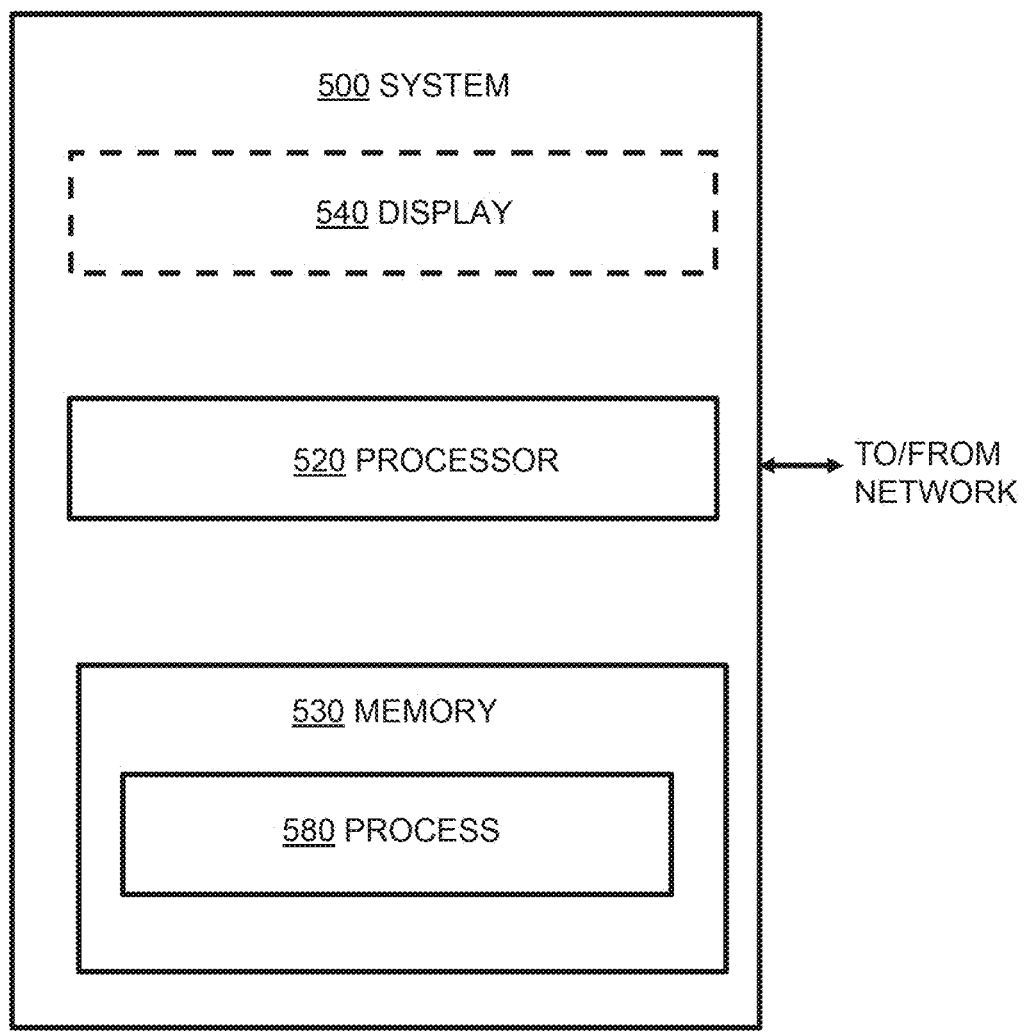
FIG. 5 is a block diagram of an exemplary computer system useful in one or more embodiments of the invention.

As used herein, an "electronic bill presentment system using customer service providers" refers to a system wherein electronic bills are distributed from billers, through an aggregator switch, out to financial institutions or other customer service providers such that those financial institutions or other customer service providers can display the electronic bills, through the financial institutions' or other customer service providers' own on-line banking interface, to bill-paying customers of the financial institutions or other customer service providers. FIG. 5 of the herein-referenced US Patent Publication 2011-0251952 A1 of Mary L. Kelly et al. shows an exemplary block diagram of an electronic bill presentment system, including a bill payment platform and a bill presentment platform; the bill payment platform may utilize techniques disclosed in the herein-referenced US Patent Publication 2012-0197788 A1 of Hemal Sanghvi et al.

Some electronic bill payment systems use the NACHA ACH Standard Entry Class (SEC) formats, such as CIE (Customer Initiated Entries), CTX (Corporate trade exchange); CCD (Cash Concentration or Disbursement); or PPD (Prearranged payment and deposits). Some electronic bill payment systems use a modified form of the NACHA CIE (MOD-CIE) wherein a payment system operator requires specific values for certain fields. Some electronic bill payment systems (e.g., MASTERCARD RPPS) provide translation capability and can receive input in many different formats, translate it for internal use, and translate it again for output in many different formats, which may be the same as or different from the input formats. Some electronic bill payment systems provide customer service providers with the capability to specify when the electronic bill payment system will look to them for payment instructions. Some electronic bill payment systems provide biller service providers with the capability to specify when the electronic bill payment system will initiate payments. FIG. 5 of the herein-referenced US Patent Publication 2012-0197788 A1 of Hemal Sanghvi et al. shows exemplary system interfaces of an electronic bill payment system.

As noted above, electronic bill presentment and payment systems are conceptually different than payment card networks, and will often use electronic funds transfer from a demand deposit account. Nevertheless, some electronic bill presentment and/or payment systems receive and send data over a network such as is shown in FIG. 2, using capability such as MASTERCARD Global File Transfer (GFT). Furthermore, US Patent Publication 2010-0100480 of Theresa Altman et al., hereby expressly incorporated by reference herein in its entirety for all purposes, describes a system wherein payment of a bill using a payment card account is facilitated by formatting and dispatching a message from a bill payment provider to an electronic bill payment system. The message is flagged with a flag indicating that the message includes a non-financial, card payment, message. The message includes an identification of the biller, a card number of the payment card account, and an expiration date of the payment card account. The message is an electronic funds transfer message augmented with the flag, the card number, and the expiration date.

Some electronic bill payment systems use technology such as described in the herein-referenced US Patent Publication 2013-0290177 A1 of Milam and Klaus to reduce the number of non-electronic payments. Some electronic bill payment systems use technology such as described in the herein-referenced US Patent Publication 2013-0311362 A1 of Amy C. Milam et al. to facilitate approximately matching entered payee information to stored biller information.

ACH is a non-limiting example of Electronic Funds Transfer (EFT); various types of EFT/bank fund transfer techniques are in use in many countries around the world.

Exemplary Mobile Device

Figure 11:
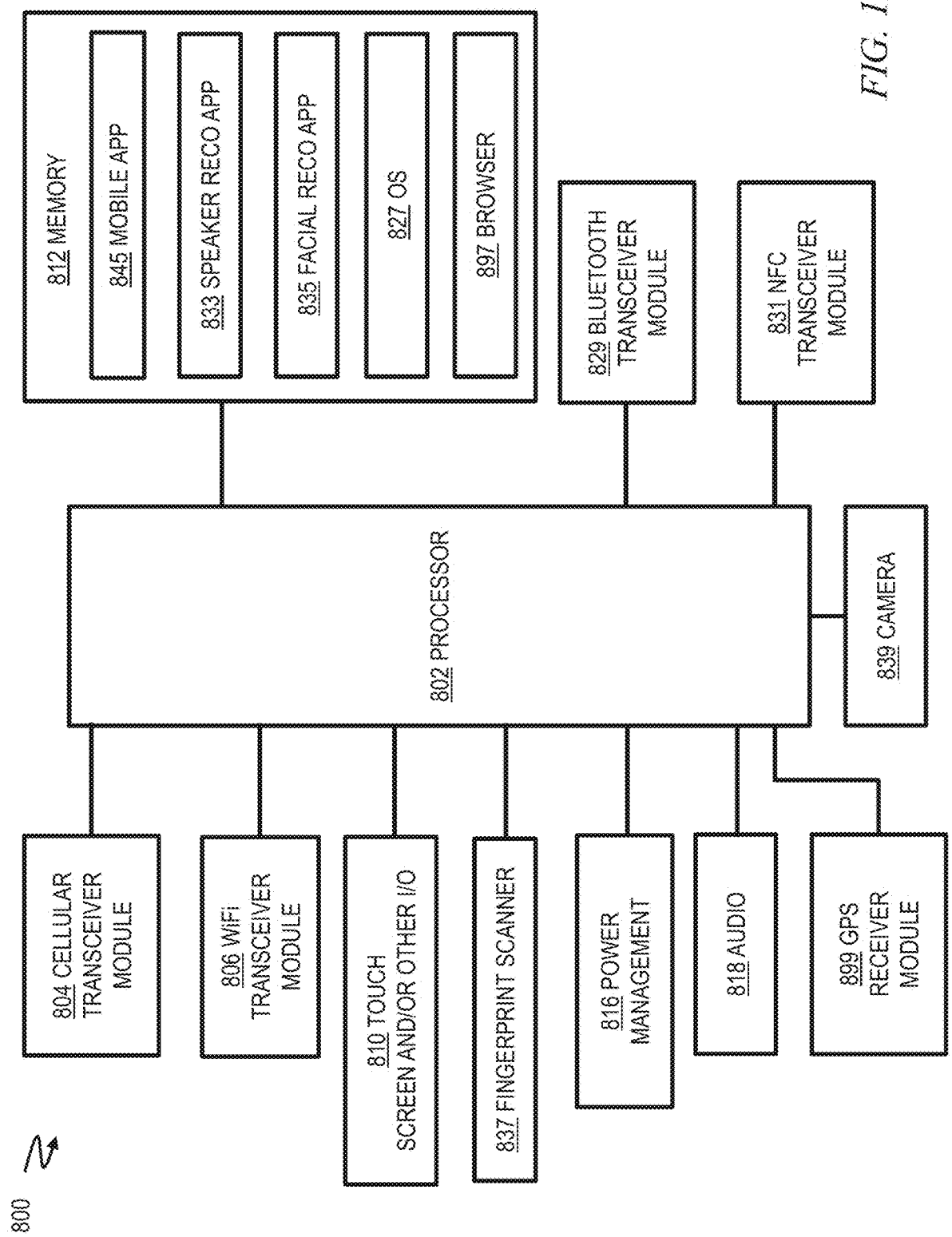
FIG. 11 is a block diagram of a "smart" phone or tablet computer useful in one or more embodiments of the invention.

FIG. 11 is a block diagram of an exemplary tablet computing device, netbook, "Ultrabook" or other subnotebook, laptop, mobile electronic device, or smart phone 800 or the like. Unit 800 includes a suitable processor; e.g., a microprocessor 802. A cellular transceiver module 804 coupled to processor 802 includes an antenna and appropriate circuitry to send and receive cellular telephone signals, e.g., 3G or 4G. In some cases, a Wi-Fi transceiver module 806 coupled to processor 802 includes an antenna and appropriate circuitry to allow unit 800 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 829 coupled to processor 802 includes an antenna and appropriate circuitry to allow unit 800 to connect to other devices via the Bluetooth wireless technology standard. In some cases, an NFC transceiver module 831 coupled to processor 802 includes an antenna and appropriate circuitry to allow unit 800 to establish radio communication via near-field communications.

Operating system (OS) 827 orchestrates the operation of unit 800. Apple's iOS and Google's Android are non-limiting examples of suitable operating systems.

Touch screen 810 coupled to processor 802 is also generally indicative of a variety of input/output (I/O) devices such as a keypad, another type of display, a mouse or other pointing device, and so on, all of which may or may not be present in one or more embodiments. Audio module 818 coupled to processor 802 includes, for example, an audio coder/decoder (codec), speaker, headphone jack, microphone, and so on. Power management system 816 can include a battery charger, an interface to a battery, and so on. Memory 812 is coupled to processor 802. Memory 812 can include, for example, volatile memory such as RAM, and non-volatile memory such as ROM, flash, or any tangible computer-readable recordable storage medium which stores information in a non-transitory manner. Processor 802 will typically also have on-chip memory.

In some cases, fingerprint scanner 837 is coupled to processor 802 for biometric authentication purposes. An appropriate corresponding software application (not separately depicted) may reside in memory 812 in some instances. A digital camera 839 is coupled to processor 802. Camera 839 can optionally be used in conjunction with a facial recognition application 835 in memory 812 for biometric verification. A microphone in audio module 818 can optionally be used in conjunction with a speaker recognition application 833 in memory 812 for biometric verification; a suitable acoustic front end can be provided.

A GPS receiver module 899 coupled to processor 802 includes an antenna and appropriate circuitry to allow device 800 to calculate its position by precisely timing the signals sent by GPS satellites high above the Earth. Corresponding software resides in memory 812.

Memory 812 can also include, for example, a stored PIN for comparison with a PIN entered via touch screen 810; extracted facial features from the legitimate owner of the phone for comparison with facial features extracted from a picture taken by camera 839; extracted fingerprint features from the legitimate owner of the phone for comparison with fingerprint features obtained from a scan carried out by scanner 837; and/or extracted voice features from the legitimate owner of the phone for comparison with voice features extracted from a voice sample obtained from a microphone in audio module 818. Note that elements in FIG. 11 are shown connected directly to processor 802; however, one or more bus structures can be employed in one or more embodiments. Furthermore, elements shown as implemented in software may be implemented at least in part in hardware for speed, if desired.

Browser program 897 in memory 812 deciphers hypertext markup language (html) served out by a server such as system 500 (discussed below) for display on screen 810 or the like.

Application 845 in memory 812 is discussed below

Every instance need not necessarily have every feature depicted in FIG. 11.

Real-Time Digital Cash Management Solution

As noted above, currently, about seventy percent of small businesses and microbusinesses do not use any kind of software to invoice their customers. About thirty percent of small businesses use software solutions such as Intuit's QuickBooks software (registered marks of Intuit Inc., Mountain View, CA, USA). As also noted above, current techniques for paying small businesses/microbusinesses are inefficient.

Figure 12:
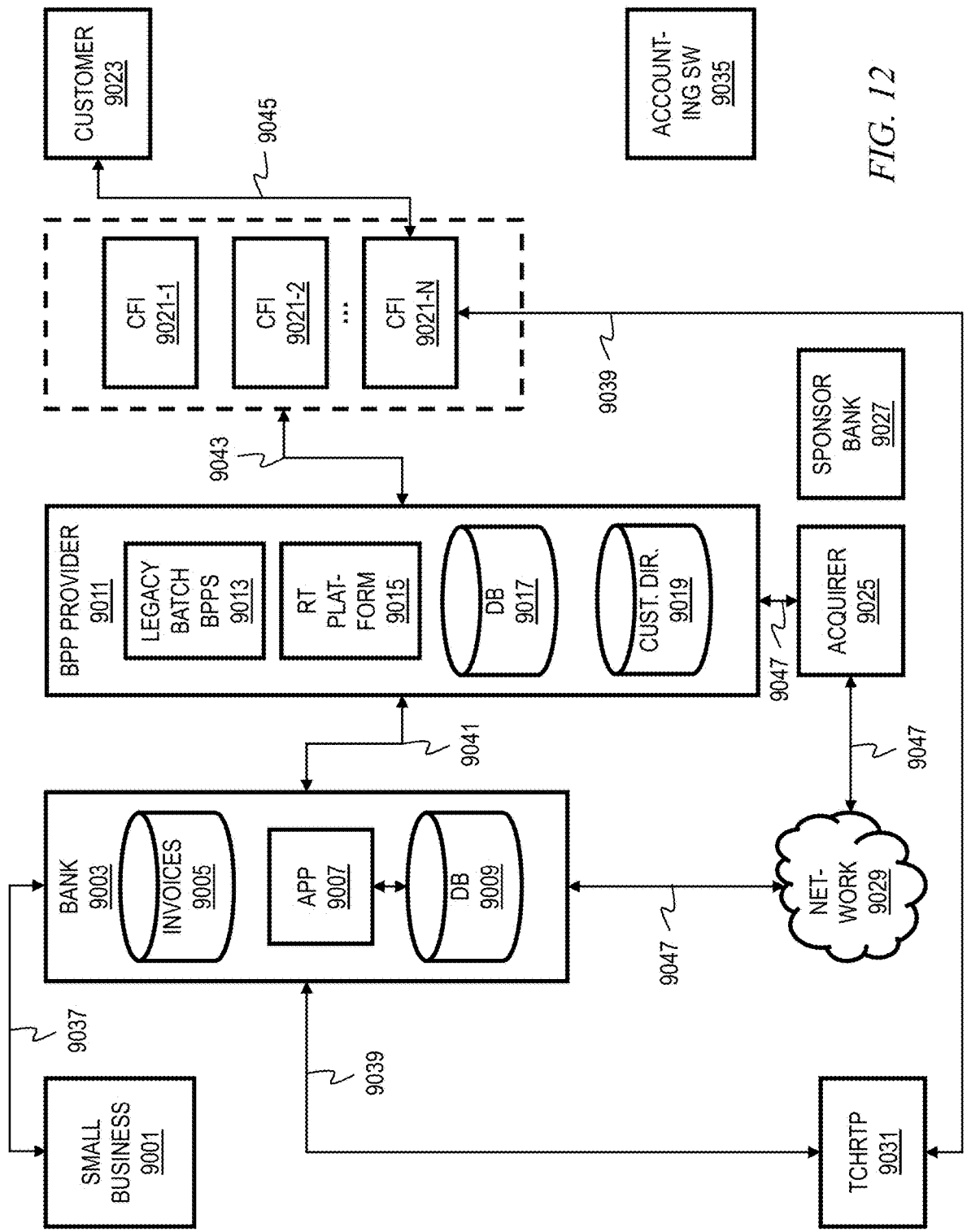
FIG. 12 depicts an exemplary block diagram and data flow diagram, according to an aspect of the invention.

One or more embodiments advantageously provide a small business/microbusiness invoicing and payment solution with a two-prong approach to permit the small business to invoice and obtain payment. Referring to FIG. 12, in one aspect, a bill presentment and payment (BPP) provider 9011 or similar entity (MASTERCARD International Incorporated is a non-limiting example) provides an API (symbolized by arrow 9041) to a bank 9003. The bank 9003 can include a small business app 9007 in its portfolio and/or provide small business functionality in its mobile banking app (this option is also generally symbolized by app 9007). The small business 9001 can download the app 9007 from the bank 9003 (symbolized by arrow 9037), and the app then resides in memory 812 as mobile app 845, for example. The app 9007 can be a cash management app and/or an on-boarding app.

Figure 13:
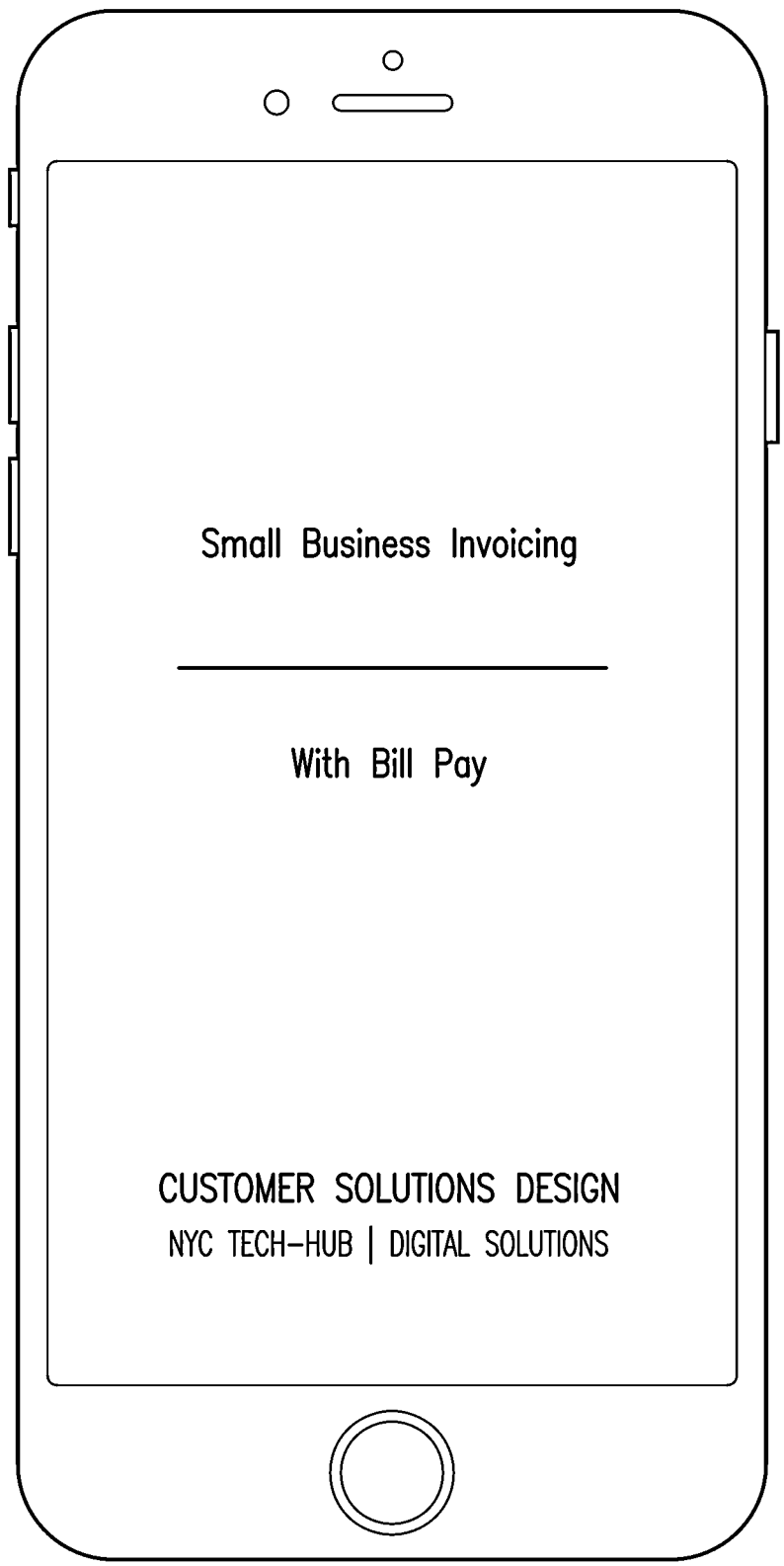
FIGS. 13-26 are exemplary screen shots of a cash management application, according to an aspect of the invention.
Figure 14:
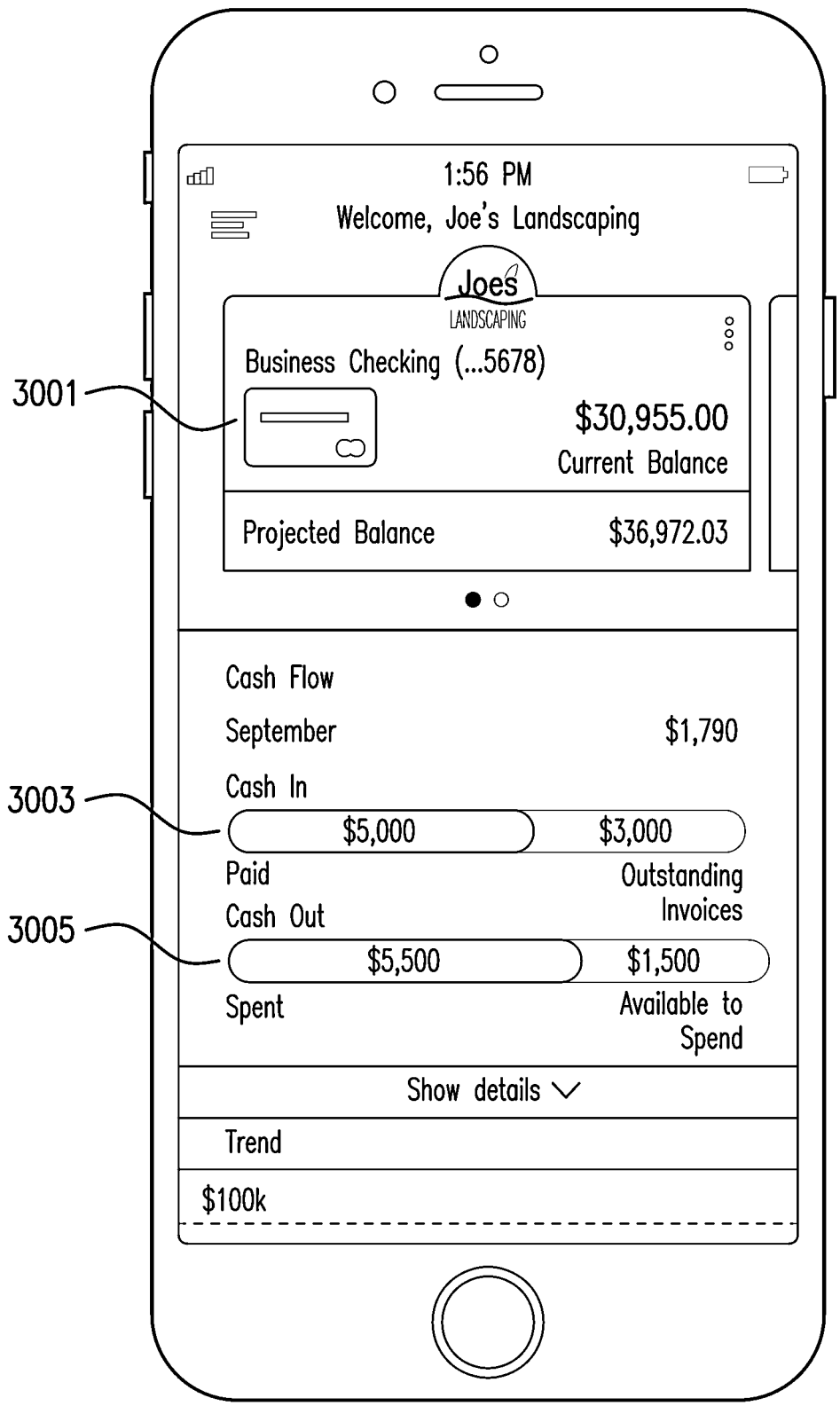

The small business (e.g. "Joe's Landscaping") accesses an appropriate section in the app 845/9007 or accesses the bank's online banking web site via browser 897, and can fill out a profile, including the name, address, and logo for the small business, as well as the small business' debit card information. In one or more embodiments, the small business thus creates a profile for itself in the app 845/9007. The profile can be stored, for example, by BPP provider 9011; for example, in database 9017 and optionally in database 9009 of bank 9003. In one or more embodiments, the small business 9001 is also provided with a cash management solution and a cash position snapshot/dashboard. FIG. 13 shows an exemplary welcome screen of the app 845/9007, while FIG. 14 shows an exemplary home screen of the app 845/9007, including current checking account balance 3001, and monthly cash flow including cash in 3003 and cash out 3005. In one or more embodiments, the small business is able to track its exact cash position at any point in time, as well as the number of invoices outstanding, the number of invoices scheduled by the customer, the number of invoices paid, and so forth. Indeed, in one or more embodiments, the small business is provided with a complete picture as to where it stands from an invoice and payment standpoint.

In one or more embodiments when the small business fills out its profile on the cash management app 845/9007, it is onboarded on the back end into a BPPS biller directory, as a biller. For example, the small business may be onboarded into a biller directory of a legacy batch BPPS 9013, such as MASTERCARD RPPS. In essence, the small business enters itself into the BPPS biller directory as a self-service function.

Thus, in one or more embodiments, there is a mobile app 845/9007 on the mobile phone 800 that allows the small business 9001 to register into the BPPS biller directory; entity 9011 provides an API (symbolized by arrow 9041) through the bank 9003 to accomplish this. In one or more embodiments, the mobile app is the small business' banking app, and entity 9011 provides an API consumed by the banking app 845 on the mobile phone 800 to allow the small business to register into the entity's legacy BPPS biller directory.

Advantageously, while small businesses may be more interested in the cash management solution and obtaining payment, in one or more embodiments, they are seamlessly onboarded by entity 9011 into the legacy BPPS biller directory. In one or more embodiments, this process is self-managed and it is in the small business' self-interest to keep its profile up to date (such profile can include, e.g. the business' address, debit card, banking information, and the like) so the small business can obtain payment. One or more embodiments thus provide an API-based solution connected to BPPS 9013.

Figure 15:
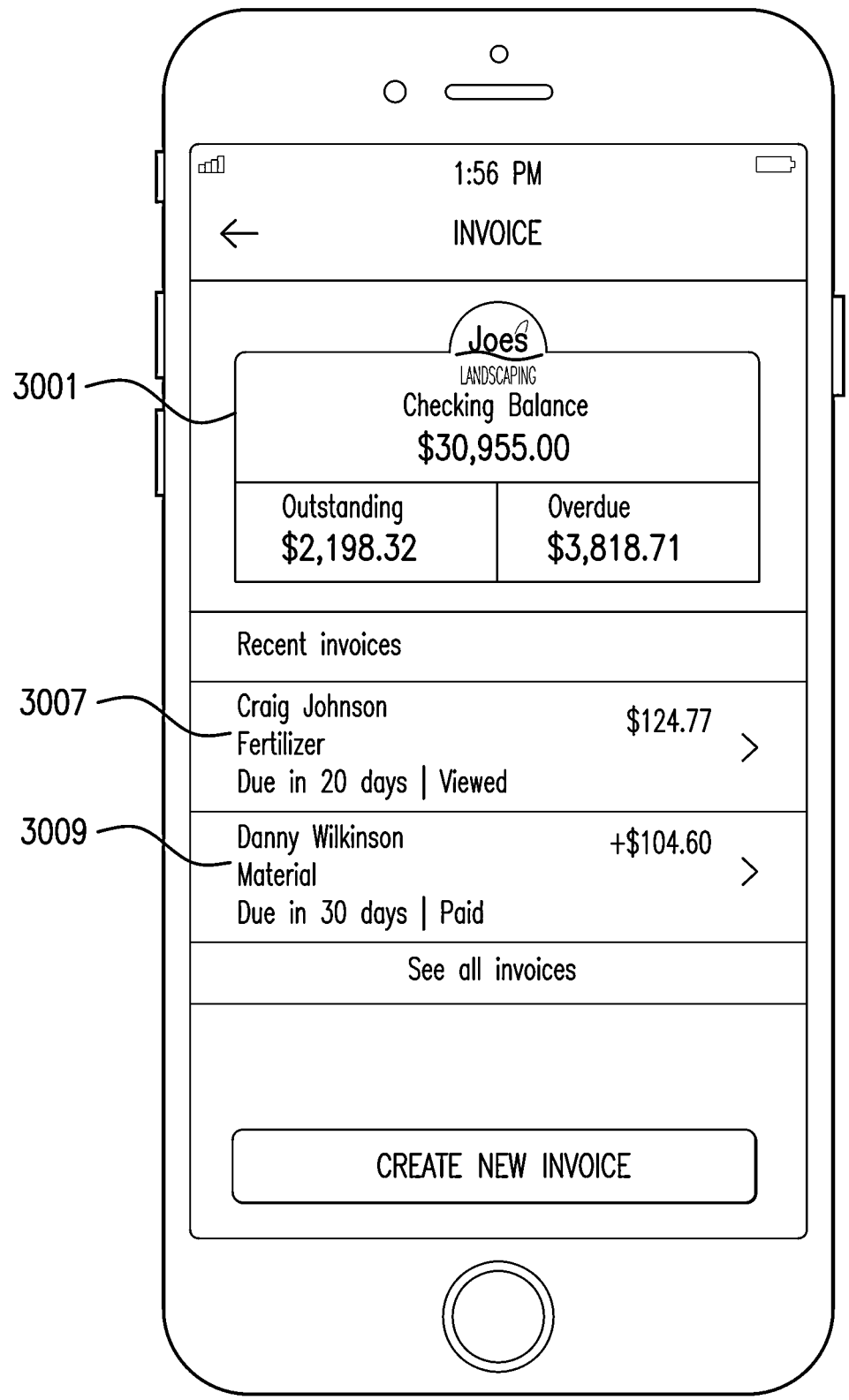
Figure 16:
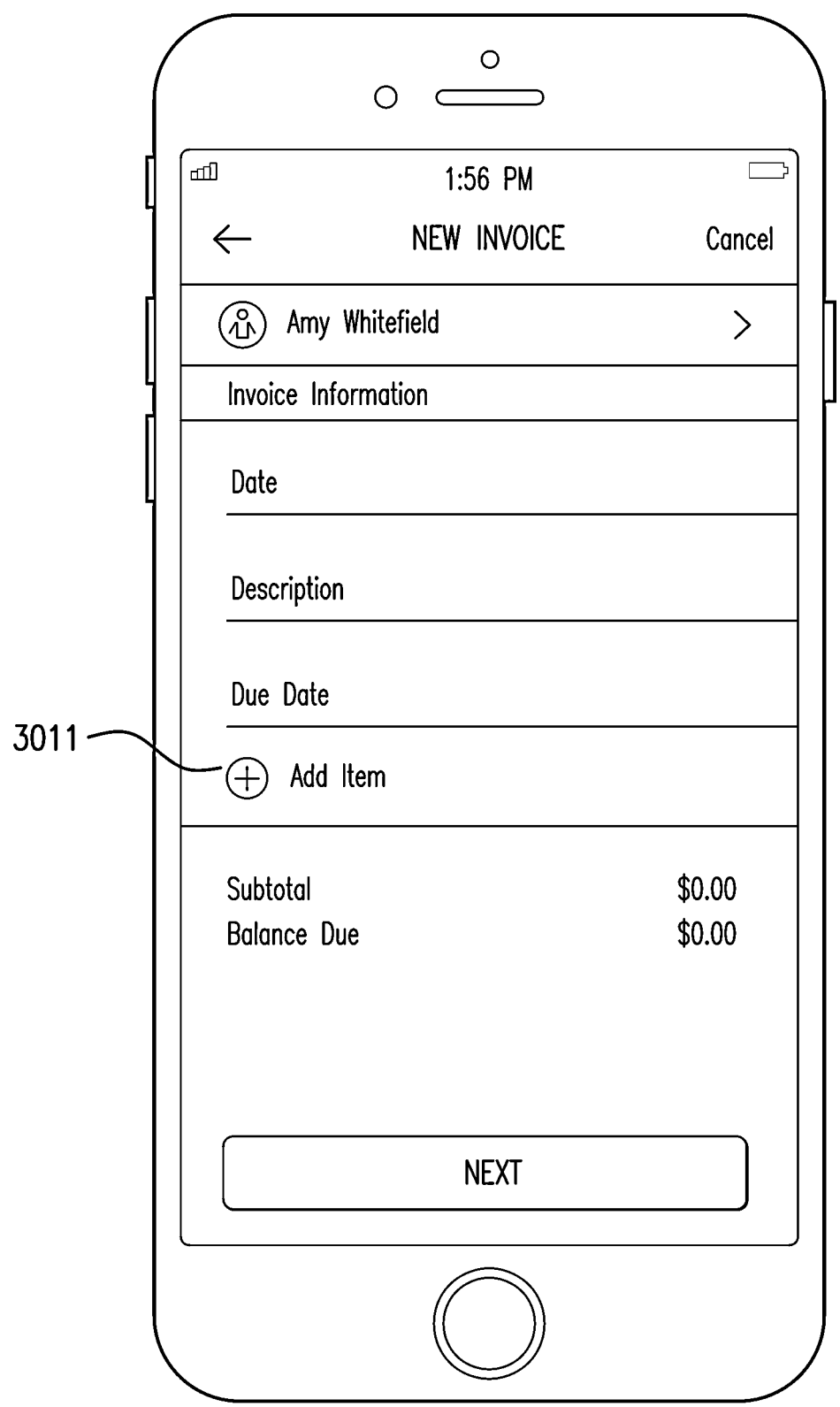
Figure 17:
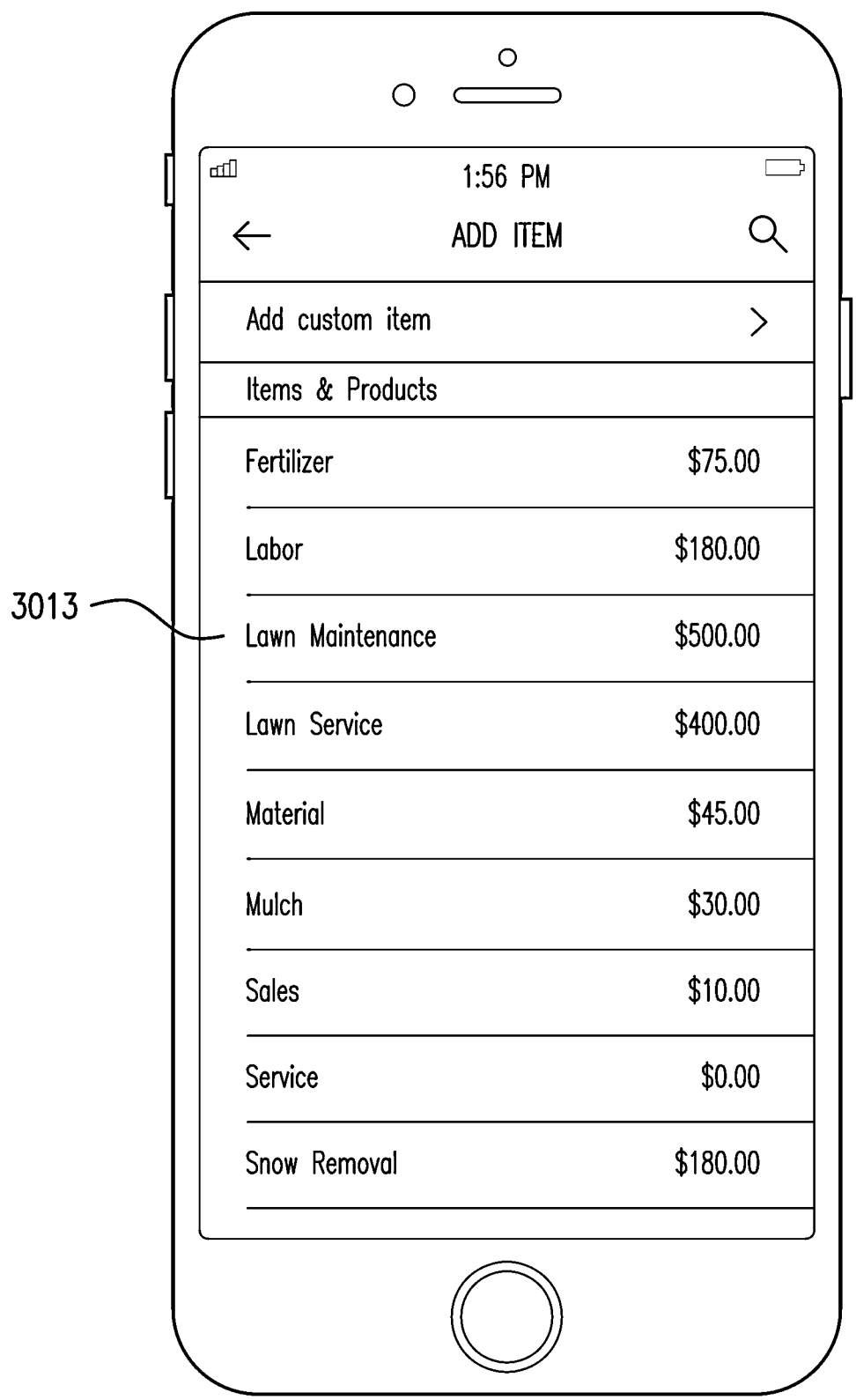
Figure 18:
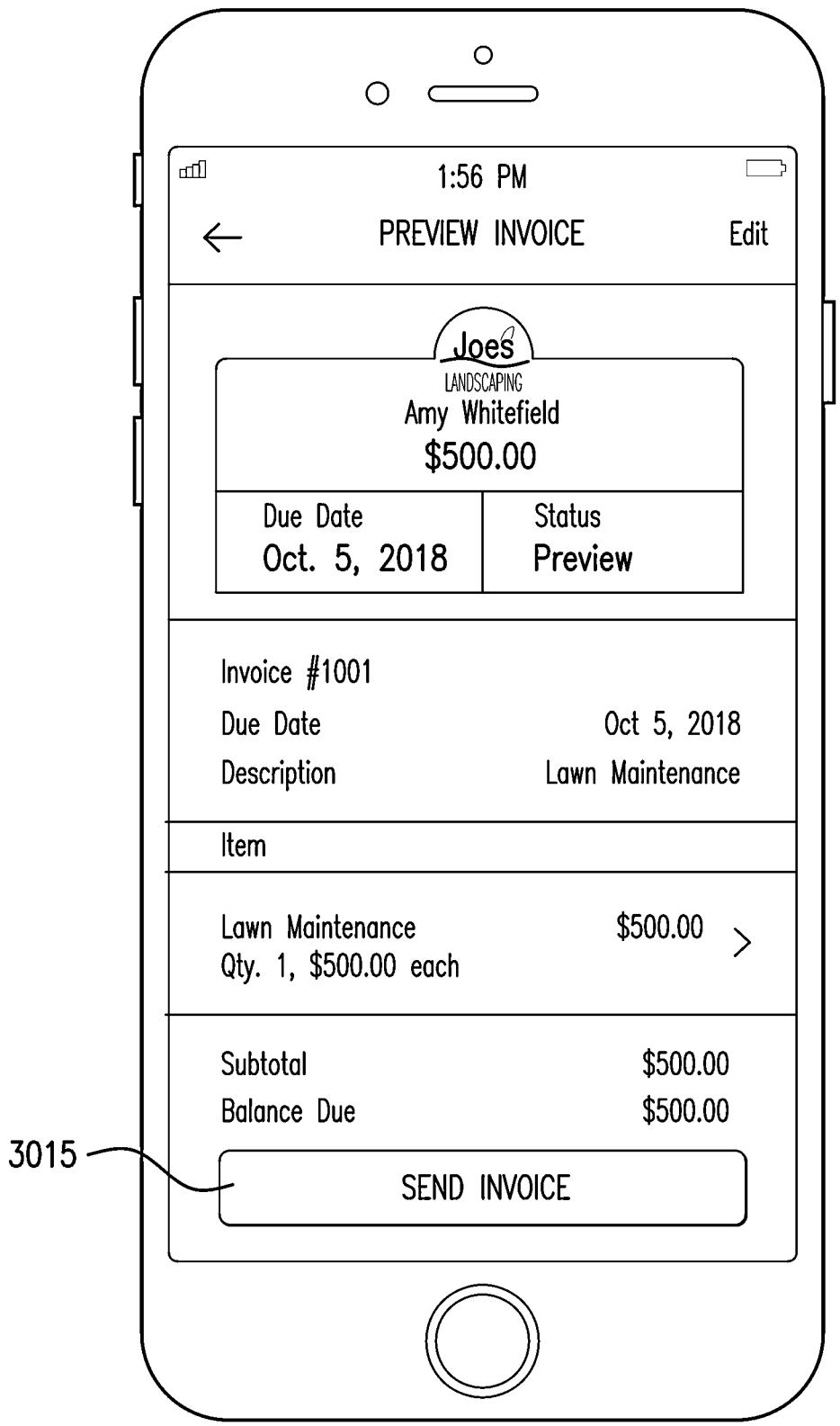
Figure 19:
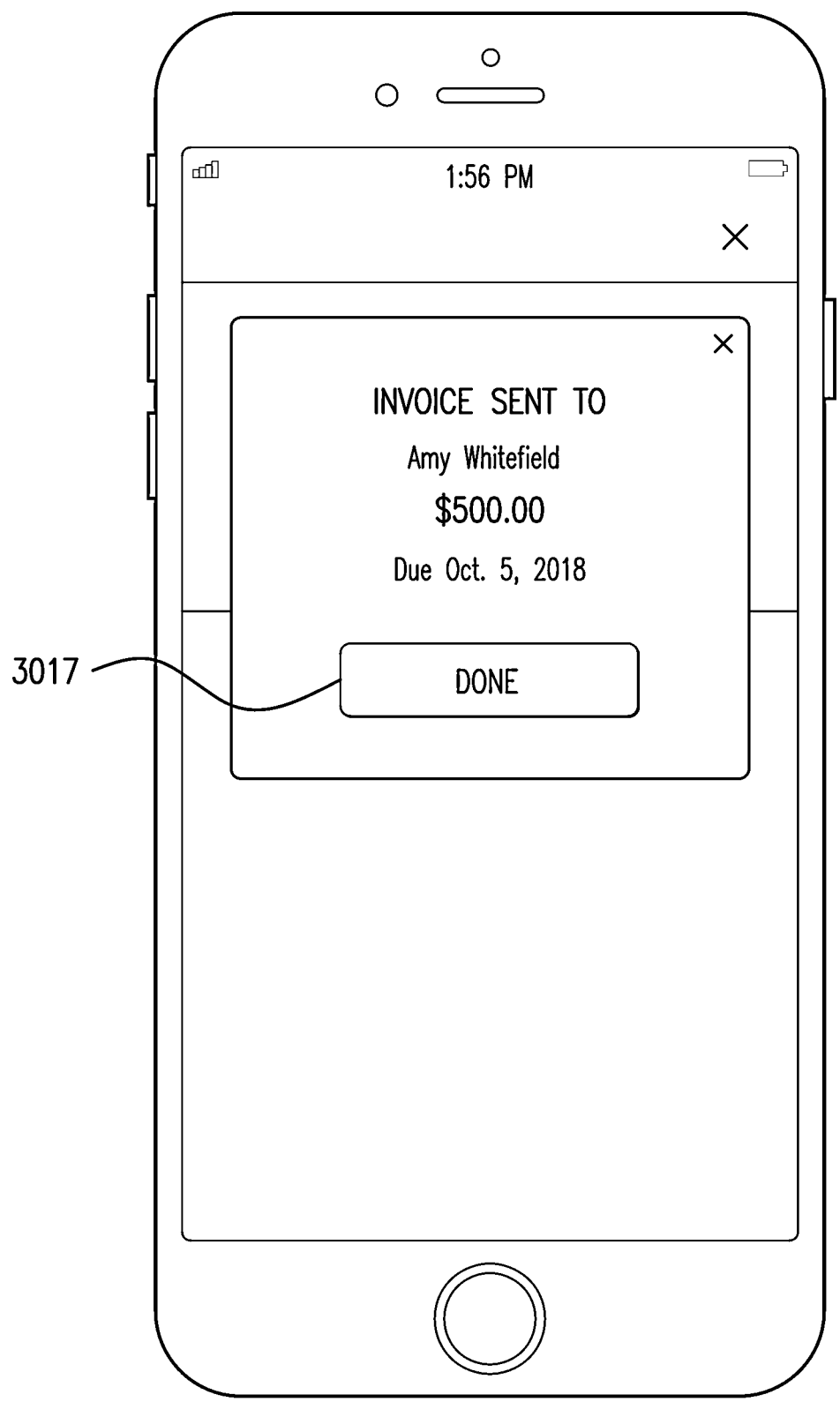

Once the above-described process is completed, the small business is in the biller directory. When the small business wants to send an invoice, it fills out a template (for example, provided by entity 9011), enters the customer information (name, e-mail address and/or phone number), and hits "send." FIG. 15 shows an exemplary invoicing "top" screen including current checking account balance 3001 (immediately below and not separately numbered, outstanding invoice balance and overdue invoice balance), and recent invoices 3007, 3009. FIG. 16 shows creation of a new invoice for a customer "Amy Whitefield" including an option to "add item" as seen at 3011. FIG. 17 shows a screen resulting from selecting "add item" in FIG. 16, wherein a number of items can be selected, including "lawn maintenance" 3013. FIG. 18 shows a preview of the resulting invoice for $500 for lawn maintenance. If the invoice is correct, button 3015 is selected to send the invoice. FIG. 19 shows the resulting confirmation screen. To clear the notification, the user selects "done" 3017. From the BPPS customer directory 9019, it is possible to find the customer 9023 and the bank with which the customer has a bill payer relationship (e.g., one of the customer financial institutions 9021-1, 9021-2 . . . 9021-N; in this case, 9021-N). Note that customer directory 9019 is logically distinct from the biller directory discussed elsewhere; however, there could be physical overlaps if the biller also behaves as a customer (or vice-versa), depending on context.

Figure 20:
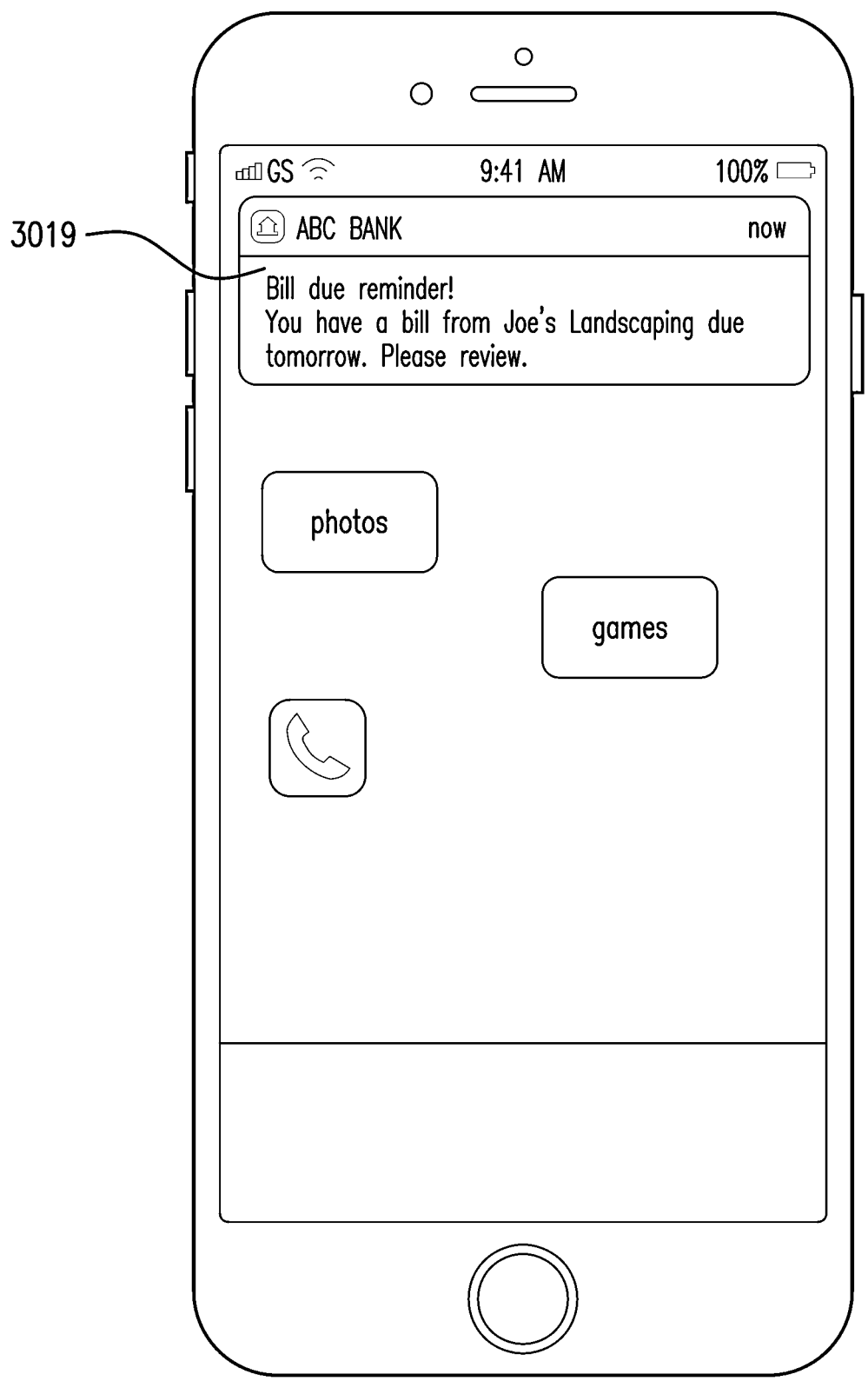

Then, customer 9023 is sent a request for payment through BPP provider 9011 (symbolized by arrows 9037, 9041, 9043, 9045; note that arrows in FIG. 12 may symbolize multiple data flows to reduce clutter). In one or more embodiments, the request for payment is sent through the bill pay solution of entity 9011 (e.g. legacy BPPS 9013 upgraded with real-time functionality via RT Platform 9015) to the bank 9021-N, and the customer 9023 receives, e.g., a mobile notification that "You have an invoice from Joe's landscaping for $500. Do you want to pay it?" The customer can receive, for example, a notification when the invoice is first submitted, and a reminder shortly before the invoice is due. FIG. 20 shows an exemplary screen of the customer "Amy Whitefield" including a reminder 3019. The customer then "hits" the notification, is taken to the bill pay app, on the mobile banking app of the customer's bank 9021-N; the customer can then pay immediately or schedule payment for a certain date. Note that in one or more embodiments, the customer's mobile banking app is a different app than app 9007/845.

Figure 21:
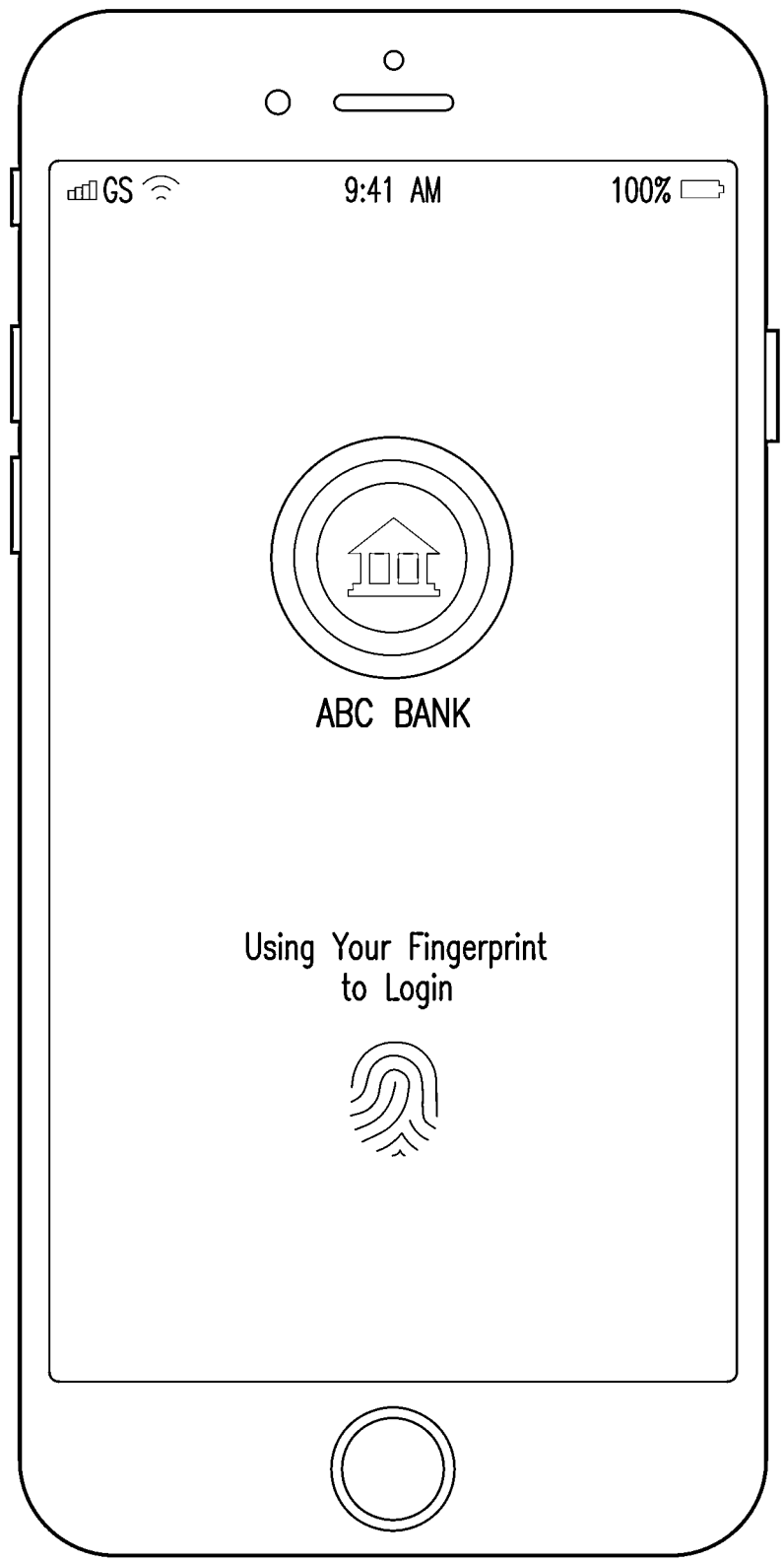
Figure 22:
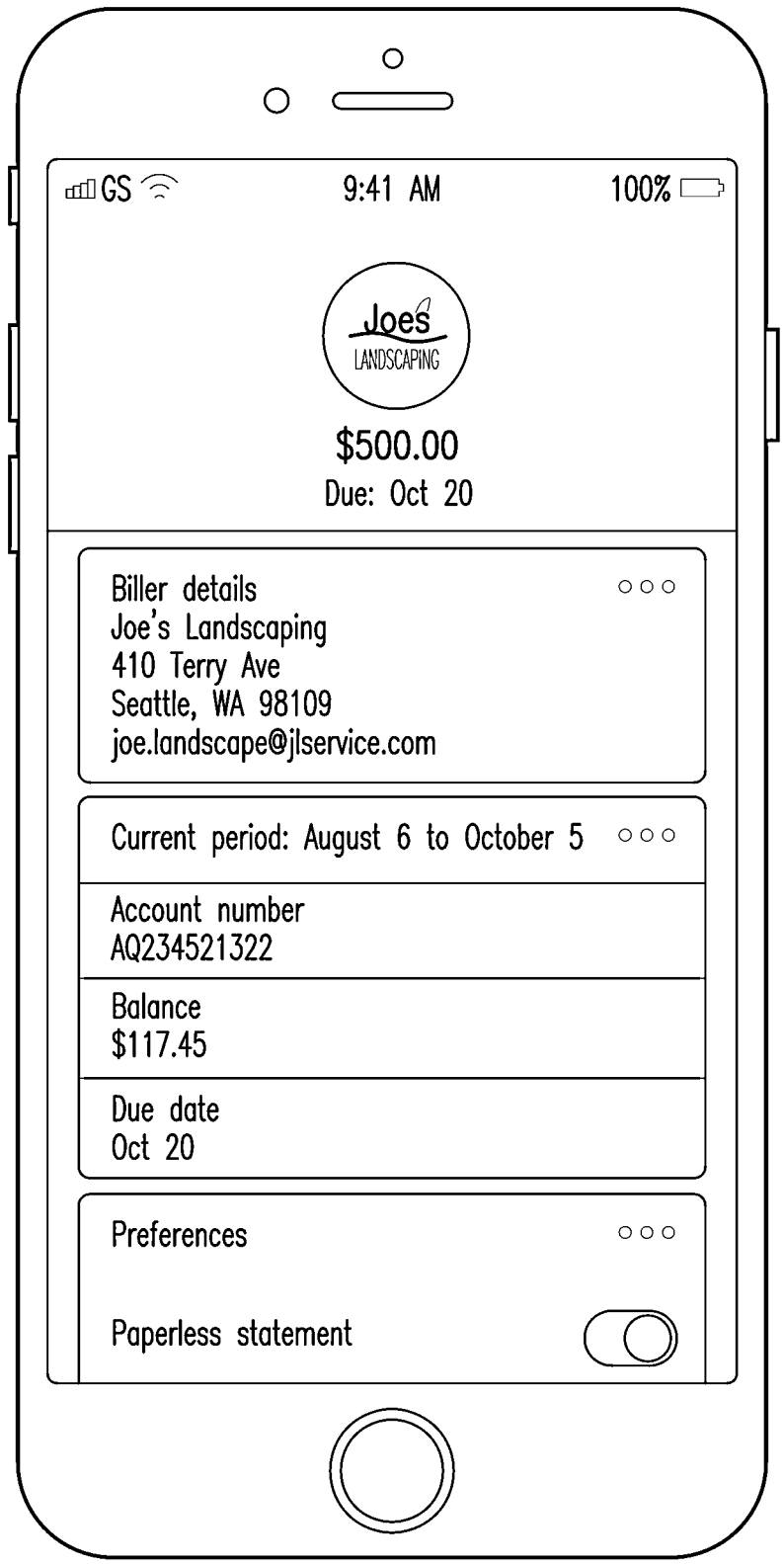
Figure 23:
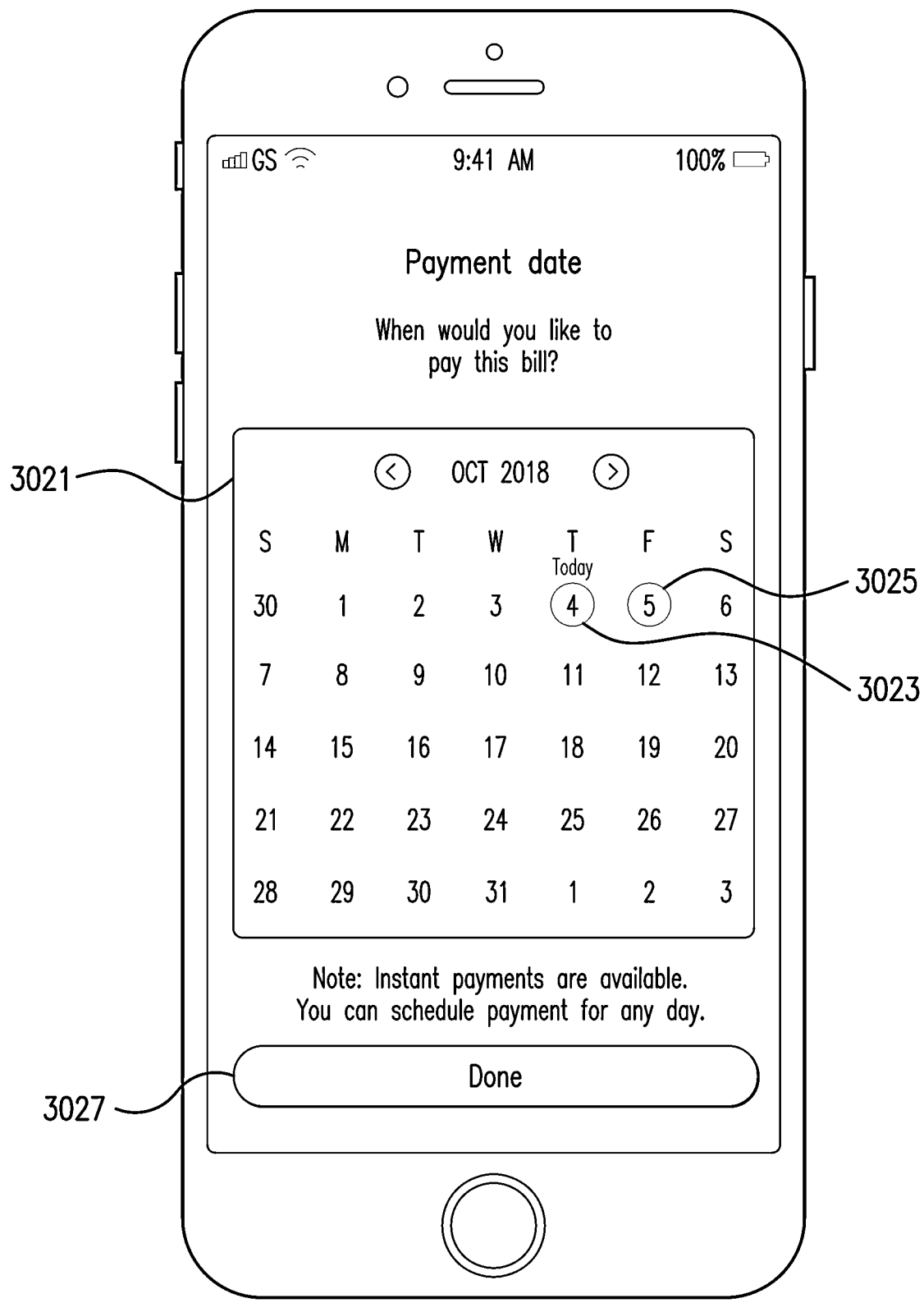
Figure 24:
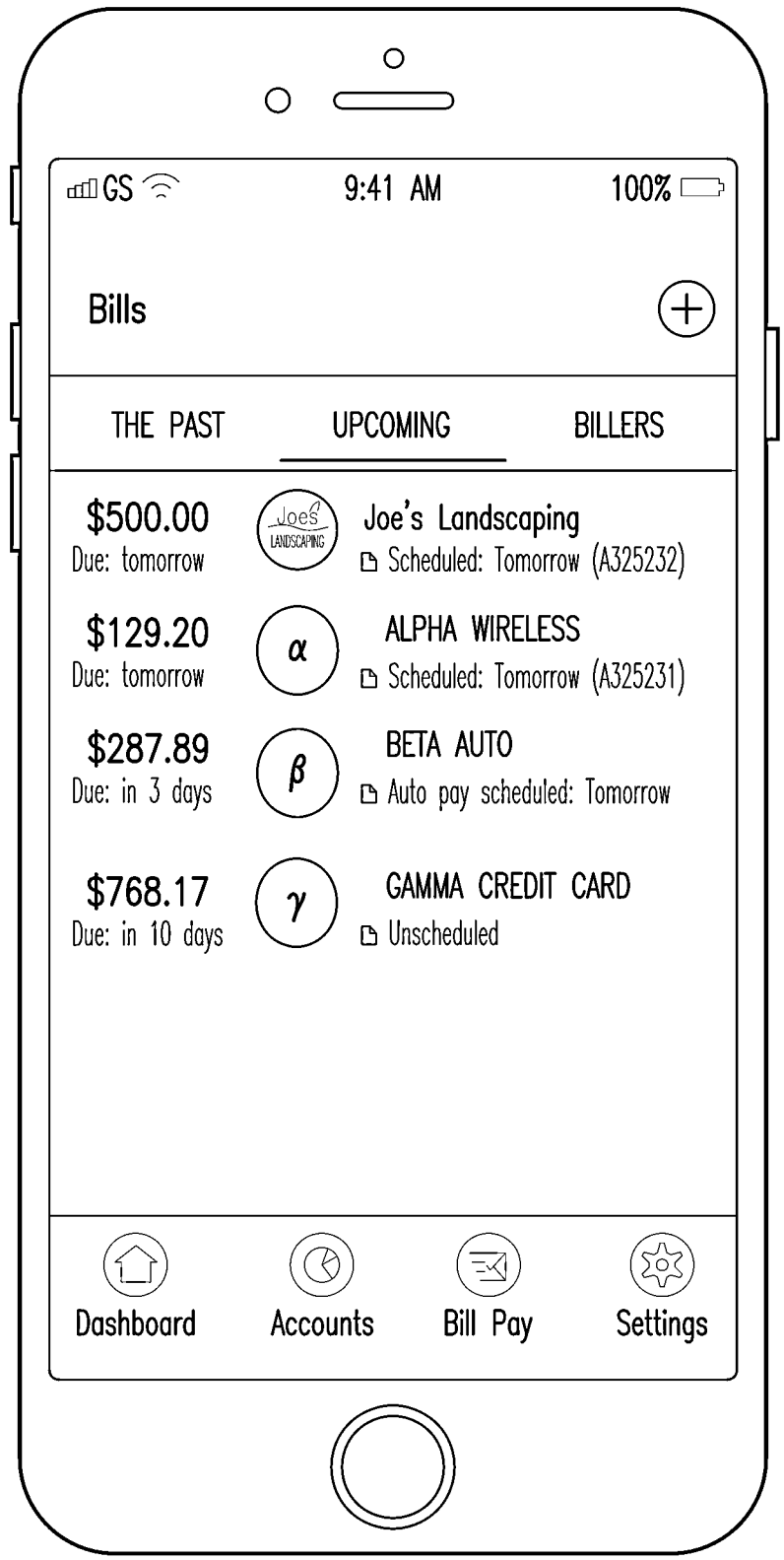

FIG. 21 shows the customer "Amy Whitefield" authenticating herself to the bill pay app of her bank "ABC Bank" via biometric authentication (fingerprint). FIG. 22 shows the invoice from "Joe's Landscaping" as displayed on the screen of customer "Amy Whitefield" in response to her touching reminder 3019 and authenticating herself. FIG. 23 shows customer "Amy Whitefield" scheduling a payment. A calendar is displayed at 3021; today's date (Oct. 4, 2018) is outlined, as seen at 3023; and the desired payment date (Oct. 5, 2018) is highlighted, as seen at 3025. When the appropriate date has been selected, the customer hits "done" button 3027. The customer may also be given the option to see a list of bills due, as seen in FIG. 24, including those upcoming, amount and when due; or those recently paid. An option to display a list of billers can also be provided.

Figure 25:
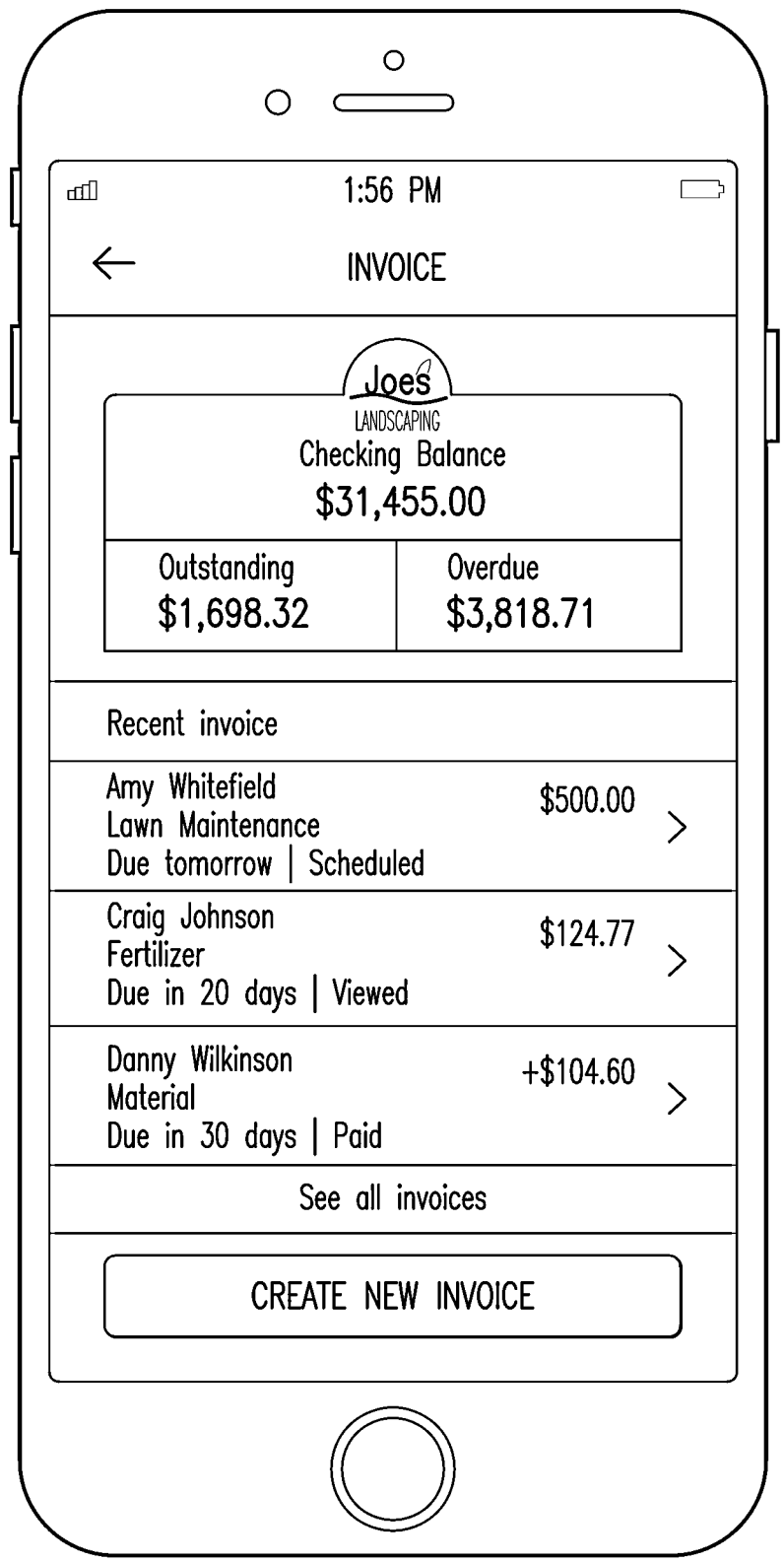

If the customer schedules payment for a certain date, provider 9011 will know about it because the customer's bank 9021-N is connected to provider 9011 as seen at 9043 (in one or more embodiments, this aspect is further facilitated by the bank being a participant in the bill payment network provided by BPP provider 9011). Provider 9011 can then update the dashboard of small business 9001 in app 9007/845 to indicate that a certain customer has scheduled a certain payment on a certain date. For example, as seen in FIG. 25, the invoice to "Amy Whitefield" is indicated as "Scheduled." Other exemplary invoice statuses include "viewed" and "paid." If the customer 9023 hits "pay" rather than scheduling payment for later, then the payment will be sent in real time to the small business, either through the real-time payment platform 9015, or using MASTERCARD SEND as discussed above. Which technique is used will depend on what has been set up for the small business 9001 in a profile in database 9017 (and optionally in database 9009). The small business 9001 gets paid in real time if the customer 9023 hits "send." The dashboard is updated with the real-time cash balances, and at all times the small business has an accurate view of its current cash flow position; i.e., money it has now and/or money that will come in later.

One or more embodiments advantageously provide a combination of an app 9007/845 that the small business 9001 uses to obtain payment through bill pay provider 9011; a cash management solution with invoicing; BPPS onboarding; and real-time payment (e.g. via platform 9015).

As noted above, currently, small and micro businesses do not have an efficient way of invoicing their customers and obtaining payment. Most are still using paper invoices and receiving paper checks; some are using electronic techniques of limited scope. Certain issues arise with card transactions for small and micro businesses, as currently implemented. Proximity is required for swiping/tapping of cards. In the absence of proximity, the process of obtaining card information typically requires some type of a phone call to obtain the card number (PAN), card verification value/CVV (security code), expiration date, etc. This works, but involves friction/inconvenience such as a phone call between the customer and the small business. More recently, small and micro businesses have used person-to-person (P2P) techniques such as Venmo and Zelle. However, these techniques are geared to person-to-person payments and generally do not permit invoicing but rather only constitute a request to pay a certain amount.

As noted above, Intuit provides the QuickBooks product, which includes a payment module. The customer (i.e. small or micro business that is the customer of Intuit) enters the email address and phone number of the small/micro business' customer. Intuit will create and send an invoice, via e-mail, to the customer. Again, however, the transaction that the customer executes from the e-mail is either a card transaction or an ACH transaction. For ACH, the customer clicks on a link, enters the account and routing number, and the money is pulled from the customer's account. It is inconvenient for the customer to enter all the required information, and the card alternative is typically expensive for the small- or micro-merchant.

One or more embodiments advantageously provide an easy, inexpensive way for a small business to invoice its customers and obtain payment through bill pay functionality of a bank, using real-time messaging on the bill pay system. In essence, one or more embodiments piggy-back on the bill-pay real-time messaging to create the request for payment to the customer, and then the payment from the bill pay application by the customer that goes in real time to the small business' account. In one or more embodiments, there are two ways the payments can be made in real time to the small business, as well as a slower way.

Referring again to FIG. 12, in a first real-time way, Real-Time Payments (RTP) functionality 9031 from The Clearing House Payments Company L.L.C. is employed to provide payment directly into the small business' account in real time, as indicated by arrows 9039. In a second real-time way, a special card payment transaction such as MASTERCARD MONEYSEND can be employed, if the small business 9001 has entered its debit card information into app 9007, as indicated by arrows 9047 showing passage of the special payment transaction through the acquirer 9025, and payment network 9029 (e.g., network 2008 or the like) to the small businesses' bank 9003. A service such as MASTERCARD SEND can be employed in some instances (a gateway into multiple debit card networks including the ability to utilize MASTERCARD MONEYSEND and other similar transactions in other networks). In addition to use of TCHRTP and MASTERCARD SEND/MASTERCARD MONEYSEND, in another aspect, funds can be moved through traditional ACH transfer, but with real-time messaging from the customer's bank 9021-N through BPP provider 9011 to the app 845/9007 of the small business 9001 to indicate that payment is pending via ACH. Furthermore in this regard, bank 9003 could extend payment to the small business 9001 based on the real-time messaging and then collect the funds when the ACH completes (actual settlement).

One or more embodiments advantageously provide a "two-pronged" solution, although either prong could be provided separately without the other. A first "prong" includes providing a white-labeled app 9007 to a bank 9003, and/or APIs provided by entity 9011 as suggested by arrow 9041. "White label" refers to a case where entity 9011 offers an API and/or app to bank 9003 but bank 9003 applies its brand. Where an API is exposed to the bank by entity 9011, the bank 9003 will build an app around the API. The API will be the 'hook' into the BPPS and will be used to update the BPPS directory with biller information. Biller information will then be available to virtually every bill pay bank, in one or more embodiments. Entity 9011 can provide a white label app, or an API, or both a white label app and an API, for example. Bank 9003 will go to market to the small business 9001, and offer the small business a cash management solution which also has invoicing and payments capability built in. A second "prong" involves making APIs available to an accounting software provider 9035 such as Intuit.

Regarding the first or banking "prong," entity 9011 provides APIs to the bank 9003 so that the bank can build an app 9007 for invoicing, payments, and cash management solution. In one or more embodiments, BPP provider 9011 uses a legacy batch BPPS 9013 such as MASTERCARD RPPS integrated with a real-time platform 9015 such as is available from VOCALINK, a MASTERCARD company, Rickmansworth, United Kingdom.

In one or more embodiments, the small business accesses the app 9007/845, logs in, and creates a profile stored in database 9009. The profile will include everything the small business will need to view its cash positions, as well as to obtain payment and create invoices 9005. For example, appropriate data will include the name of the small business, the name of the owner, an upload of the business' logo, debit card information, bank account information, and the like. Invoicing templates are also provided to the small business in one or more embodiments so that the business can pick one or more suitable templates for invoicing purposes.

Now the small business is ready to transact: the business has its cash management dashboard where it can see current cash positions, outstanding invoices, invoices scheduled by the customer for payment, accounts receivable, and so on—in essence, a snapshot of current and projected cash balances. The small business will be ready to create and send invoices. In one or more embodiments, an invoice is created using a template; the invoice will include the customer's e-mail address and phone number. In one or more embodiments, the invoice has a transition phase and is logged onto the database at the bank 9009 and/or 9005. Through an API call suggested by arrow 9041, the bank sends the invoice, along with the customer information such as e-mail and phone, to BPPS 9013.

Thus, by way of review, when the small business creates a profile and logs in, the bank sends the information to entity 9011 which stores the information in BPPS (9013 and/or 9017). Now, BPPS 9013 has the small business information stored—what has essentially happened is that the small business has entered its info into the app 9007/845, and "self-served" itself into the BPPS database 9013 and/or 9017 (i.e. existing database within the legacy batch BPPS 9013 and/or a new database 9017) without active involvement by entity 9011. That is to say, the small business has on-boarded itself (self-serve) into the bank 9003 and BPPS 9013. After onboarding is complete, the small business is ready to create and send invoices.

In one or more embodiments, a bill pay customer of virtually any bank is now able to find the small business 9001 in bill pay wherein BPP Provider 9011 has wide exposure to many/all banks. In one or more embodiments, other than requirements such as know your customer (KYC), this process is non-managed. Heretofore, all billers were managed.

The app 9007/845 provided by bank 9003 is typically downloaded to the small business person's phone or other device, but in some cases could be a web page viewed in browser 897. Once the small business is entered in BPPS 9013 and has created a profile including debit card information, bank account information, and/or other information, it is ready to do business. In some embodiments, the small business does not even have to create an invoice—a customer 9023 can go into a suitable application and look the small business up. For example, the customer can look up a small business (the small business would have already registered itself in the directory). The customer can then make a payment to the small business; there need not be a preceding request or invoice.

However, in an exemplary non-limiting use case to be illustrated at this time, the small business is ready to create an invoice, and send the invoice out to the customer, based on email address and/or phone number. The invoice goes to bill pay provider 9011, which looks up the small business in the biller directory (database in 9013 and/or database 9017). Provider 9011 may verify that the small business is legitimate. Bill pay provider 9011 has a customer directory 9019, with all of the enrolled customers 9023 in the bill pay system, from the financial institutions 9021-1 . . . 9021-N. Bill pay provider 9011 then sends the invoice based on the e-mail address, or phone number, looked up on the customer directory 9019, to the correct financial institution 9021-1 . . . 9021-N, as a request for payment. The financial institution in question, using its own user interface (UI), sends a notification of presentment to the customer 9023 to make the customer aware that the customer has an invoice.

The customer views the notification and (i) has the option to hit "pay" or (ii) can hit "schedule." Either way, a message is sent back to the small business 9001, as indicated by arrows 9045, 9043, 9041, and 9037.

In option (i), the message comes into BPPS 9013. Suppose it is a debit card that is being used. BPPS determines that the biller/small business is being paid by debit card; purely by way of example and not limitation, a MASTERCARD debit card. In that case, the money is sent to the small business' account at bank 9003 through MASTERCARD MONEYSEND, MASTERCARD SEND, or the like. Routing follows the four-party model: acquirer processor 9025, sponsor bank 9027, and network 9029. The debit card can be from the same bank 9003 or a different bank. In some instances, a virtual card can be employed—the customer enters bank card information but the bank converts the actual payment card number to a virtual card number for use in real-time payment via MASTERCARD SEND. In one or more embodiments, money is sent in real time, as part of a money movement aspect of the invention. In addition to the funds transfer, in one or more embodiments, there is a confirmation message to the small business, also symbolized by arrows 9045, 9043, 9041, 9037, which updates the app 9007/845 with the dollar amount of the payment. The accounts receivable (A/R) are updated when the message is sent. When the actual funds arrive, the actual balance is updated and the A/R are reduced by that amount. Then, the cash positions and the projections are updated.

In option (ii), the customer 9023 has scheduled payment for a certain date. A similar message is sent; however, the MONEYSEND aspect is not yet employed. However, a confirmation message is sent, and on the small business' app 9007/845, instead of pending, or invoice sent, the entry is updated as scheduled. One advantage of this is that the small business knows that payment is coming and can rely on same; the business knows that the customer is not ignoring it. When the scheduled date trips, a MONEYSEND payment is sent on that day. The same confirmation is sent with the MONEYSEND route, and the scheduled entry is updated to paid.

Figure 26:
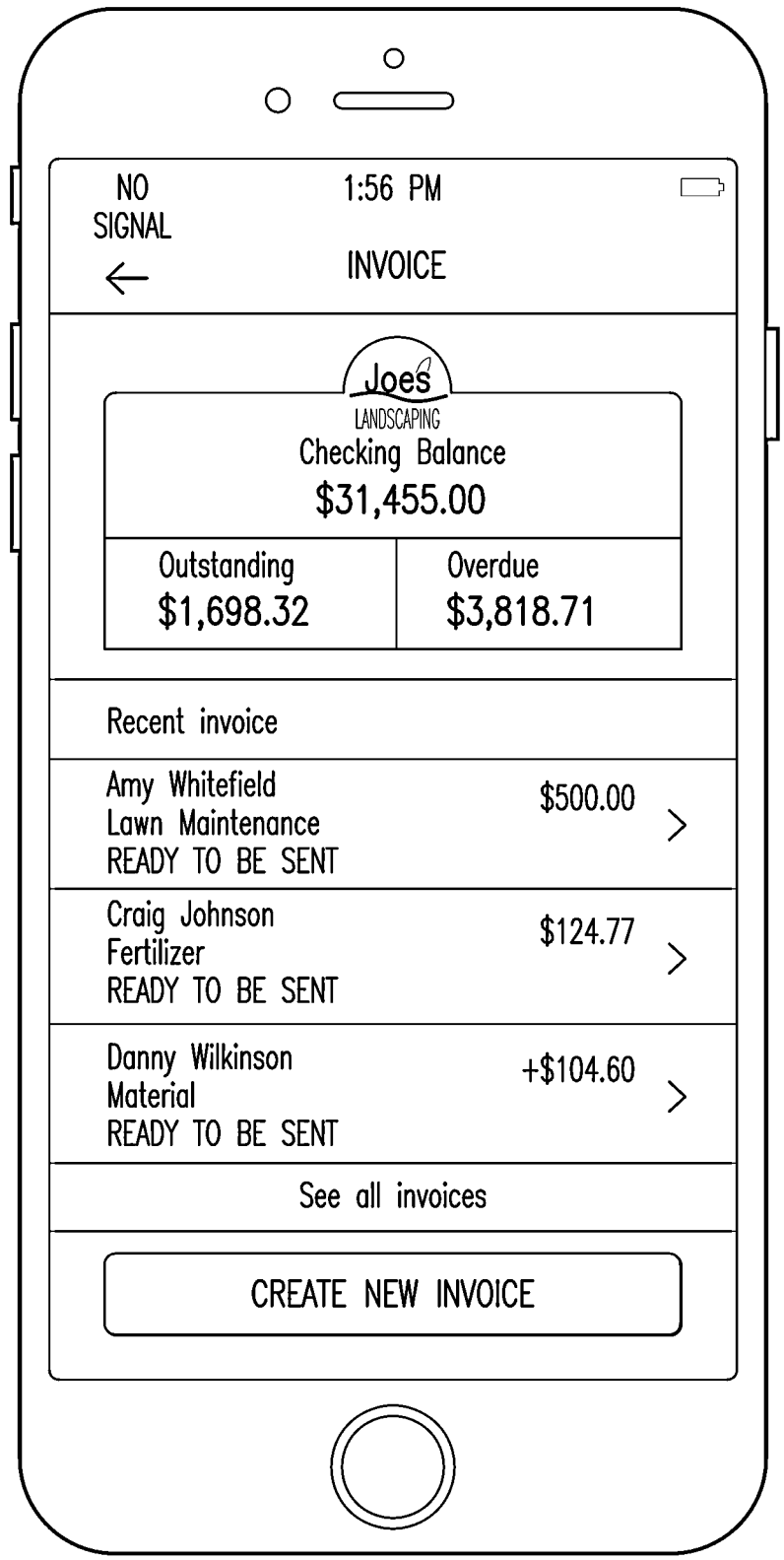

One pertinent advantageous aspect in one or more embodiments relates to the self-serve aspect of enrolling small business 9001 into BPPS 9013. Currently, databases such as 9017 are updated manually. In one or more embodiments, the bank 9003 sends messages to BPPS 9013 for update, triggered by the small business profile being created by the small business. In one or more embodiments, even if the small business is offline, it can still create the invoice. The invoices are stored in the memory 812 of phone 800 to be sent when the connection is "up" again. The small business will get an update indicating "ready to be sent"; when the connection comes back up, the stored invoices are sent over to the bank 9003. One or more embodiments thus provide the ability to deal with a service interruption in a computer network, providing a robust, fault-tolerant architecture. This can be particularly helpful for small businesses in remote areas with problematic network connectivity. Refer to FIG. 26.

In another aspect, customized alerts can be provided; e.g., via mobile device 800. Non-limiting examples include a low balance alert or payment scheduled but not made alert. In some cases, upon occurrence of significant events (e.g., when customer 9023 schedules a payment), an alert (e.g. text message) can be sent to business 9001, instead of or in addition to payment messaging via app 9007/845. An alert on every invoice may not be desirable (in one or more embodiments, this decision is made by the bank). One or more embodiments provide an option to mark important invoices for alerts; for example, from biggest and/or most risky customers. One or more embodiments also provide internal alerts for certain kinds of customers—via customer profiles—for example, flag invoice if the customer does not pay in a predetermined time period (e.g. 5 days). The predetermined time could vary based on the profile—for example, for a "risky" profile, the business may want to flag in 2-5 days; for a "safe" profile, where it is highly likely that the customer will pay, a flag may not be desired (in one or more embodiments, this is configurable by the small business). Some embodiments afford the small business the opportunity to pick the customer profile when sending out the invoice; e.g., if "super-risky" alert in two days of non-payment, with longer periods for less risky customers. In another aspect, the bank or a third party could provide a risk assessment of the customer to facilitate selection of a suitable profile and predetermined time (subject, of course, to any applicable privacy laws, rules, and/or regulations). In some instances, alerts can be sent via a separate channel from payment messaging; for example, a text message to the small business owner's mobile phone.

In one or more embodiments, real-time payments can be made, for example, via MASTERCARD MONEYSEND or CLEARINGHOUSE REAL-TIME PAYMENTS 9031. Real-time payment engine/platform 9015 facilitates real-time settlement between the customer financial institution (CFI) 9021-N (or the sending institution), and the receiving institution 9003. Thus, in one or more embodiments, once the invoice comes to the customer financial institution 9021-N and payment is made, the message to advise the small business 9001 can proceed as per path 9045, 9043, 9041, 9037, while actual money movement can proceed, for example, via path 9039 or path 9047. Path 9039 via clearinghouse real-time payments facility 9031 involves using the account number and routing number of the small business, which the CFI 9021-N will obtain through the messaging process. One or more embodiments complete the payment to the receiving financial institution 9003 in real time—seconds or minutes—as compared to 1.5 days for traditional ACH, for example.

One or more embodiments expose BPPS 9013 to the bank 9003 via APIs and/or expose a biller directory (e.g. 9013 and/or 9017) in the form of APIs.

One or more instances include invoices in a request for payment from the small business. The invoices can be encoded in a message; for example, create the invoice as a PDF and store at the bank, in an invoice database 9009. Then, the CFI 9021-N presents the request to the customer 9023, the customer requests to look at the invoice, a message goes through the bill pay network 9011 to the database 9009 to pull up the invoice.

As noted, real-time platform 9015 can employ, for example, technologies available from VOCALINK to enables real-time payment and messaging. VOCALINK provides a payment switch which utilizes ISO 20022 messaging and switches messages from one entity to another based on appropriate criteria.

BPPS such as 9013 have traditionally been batch-based. One or more embodiments add a messaging layer on top of traditional BPPS, including the request for payment and the payment confirmation message from the CFI to the biller. One or more embodiments advantageously extend an existing bill pay platform 9013 to permit microbusinesses and small businesses to onboard themselves into BPPS and be able to send invoices and obtain payment without being actively managed. One or more embodiments provide the ability to send an invoice out to a bill pay platform, with real-time messaging, and in real time, with the invoice also being available to the customer. Indeed, one or more embodiments store small business information through the APIs into the DB 9017, without requiring active management. One or more embodiments provide invoicing and payments messaging; receiving invoices, routing invoices, obtaining the payments, and routing the payments, in real time.

In one or more embodiments, the business' bank 9003 creates an app 9007/845 that uses the APIs of BPP provider 9011. Bank 9003 enables messaging between bank 9003 and BPP provider 9011 using the APIs. In one or more embodiments, bank 9003 manages KYC (know your customer), AML (anti money-laundering) and other regulatory checks on the small business; authentication; Office of Foreign Assets Control (OFAC) checking; and other business functions such as marketing. The bank 9003 may provide the app 9007/845 as a stand-alone app or as an augmentation to its mobile banking app. In one or more embodiments, a small business person might log in as an individual, with a bank account, to his or her mobile banking app, and authenticate himself or herself. She or he would then also be authenticated against a user profile—the user profile would be "individual" so he or she would get a view of a single-user mobile app and be able to look at her or his personal account and so on. On the other hand, if he or she is authenticated as a small business, then his or her view is a small business view on the mobile app—in one or more embodiments, this will include all the basic functions, as well as the cash management portion as discussed herein, with cash positions and invoicing capabilities.

In another aspect, instead of bank 9003 providing app 9007/845 to small business 9001, entity 9011 partners with a provider of accounting software 9035 (e.g.

Intuit/QuickBooks). Software 9035 sends an e-mail to the customer 9023 using the customer's e-mail address. In this aspect, accounting software 9035 uses an API provided by entity 9011. Accounting software 9035 instead of bank 9003 sends a request to pay the invoice to bill pay product 9013. Accounting software 9035 takes on the role of the customer's bank in essence; however, payment for business 9001 still goes to the business' bank 9003. The cash snapshot is retrieved using debit card information, and the small business is loaded into the system by carrying out a balance inquiry on the debit card. In one or more embodiments, this scenario is pertinent when the small business creates its profile by using a debit card (optionally, a virtual card can be used as discussed elsewhere). The debit card information is used to obtain the current cash snapshot by running a balance inquiry on the debit card using the four party (see FIG. 2) model (ISO8583 payment card messaging) or this information can be automatically provided by the bank upon logging in.

In one or more embodiments, a copy of a legacy BPPS 9013 is made into the real-time platform 9015; essentially, old BPPS technology can be ported to the real-time platform, providing an integrated module.

One or more embodiments advantageously provide real-time funds availability to a small business, via MASTER-CARD SEND, use of a debit card, and/or a real-time payment infrastructure such as a DSS (designated settlement system)—the automated clearing house real time payment 9031 is a non-limiting example. One or more embodiments provide real-time, out-of-band alerts to a business regarding invoices; for example, a business knows, in real time via an app, the actual status of a consumer's payment-related activities (if it has been made, not made yet but scheduled, declined, etc.).

Recapitulation

Given the discussion thus far, it will be appreciated that, in general terms, an exemplary method (e.g., from the perspective of entity 9011) includes exposing a real-time electronic bill presentment and payment system (e.g. legacy batch BPPS 9013 with real-time platform 9015) of a bill presentment and payment system provider 9011 to at least one of a business financial institution 9003 and an accounting software provider 9035 via an application programming interface (symbolized by arrow 9041). A further step includes the bill presentment and payment system provider 9011 facilitating the at least one of a business financial institution 9003 and an accounting software provider 9035 providing a real-time electronic bill presentment and payment mobile application 845, 9007 to a business (e.g. small business 9001). In a non-limiting example, entity 9011 provides a "white label" app to bank 9003 which then builds an app 845, 9007 to provide to the business (e.g. small business 9001), as discussed elsewhere herein. This app may execute under OS 827 or in some instances can be in the form of html running in browser 897. Note that even if the at least one of a business financial institution 9003 and an accounting software provider 9035 develops its own app, the bill presentment and payment system provider 9011 will typically facilitate the process by specifying the interfaces. The app can use the API(s), for example.

In a still further step, the real-time electronic bill presentment and payment system (e.g. legacy batch BPPS 9013 with real-time platform 9015) obtains, via the application programming interface, from the at least one of a business financial institution and an accounting software provider, registration information (e.g. "profile" discussed elsewhere herein) provided to the at least one of a business financial institution and an accounting software provider by the business via the real-time electronic bill presentment and payment mobile application. In yet a further step, the real-time electronic bill presentment and payment system populates a biller directory database in the real-time electronic bill presentment and payment system (e.g. 9017 or a database within 9013) with the registration information provided to the at least one of a business financial institution and an accounting software provider by the business via the real-time electronic bill presentment and payment mobile application.

Advantageously, in one or more embodiments, no action, other than the facilitating, is required by the bill presentment and payment system provider 9011 for the at least one of a business financial institution and an accounting software provider to obtain the registration information from the business via the real-time electronic bill presentment and payment mobile application.

In one or more embodiments, the obtaining of the registration information by the electronic bill presentment and payment system from the at least one of a business financial institution and an accounting software provider is triggered by the business providing the registration information to the at least one of a business financial institution and an accounting software provider via the real-time electronic bill presentment and payment mobile application.

In one or more embodiments, the aforementioned exposing, facilitating, obtaining, and populating steps are repeated for a plurality of additional business financial institutions and/or accounting software providers, as the case may be, and a plurality of additional businesses. In such instances, the populated biller directory database can be made available to a plurality of customers via a plurality of customer financial institutions 9021-1 . . . 9021-N without active management other than compliance with governmental security regulations. Non-limiting examples of government security regulations include know your customer (KYC), AML (anti-money-laundering) check, and Office of Foreign Assets Control (OFAC) list.

The registration information can include, for example, business name, business address, and information for at least one of a payment card and a bank account of the business; logo, owner name, and other information can also be included if desired.

The aforementioned information for at least one of a payment card and a bank account of the business can include, for example, debit card information (e.g. account number) of the business.

One or more embodiments further include obtaining, at the real-time electronic bill presentment and payment system, from a given one of the business financial institutions and/or accounting software providers, an invoice provided by a given one of the businesses to the given one of the business financial institutions and/or accounting software providers. This is represented by arrows 9037, 9041. The invoice includes an identification of a given one of the plurality of customers. the real-time electronic bill presentment and payment system looks up a corresponding given one of the plurality of customer financial institutions in a customer directory 9019 of the electronic bill presentment and payment system based on the identification of the given one of the plurality of customers. The invoice is dispatched, from the real-time electronic bill presentment and payment system, to the given one of the plurality of customers via the looked-up given one of the plurality of customer financial institutions.

Optionally, the real-time electronic bill presentment and payment system verifies the given one of the businesses via a lookup in the biller directory database (9017 and/or database within 9013) prior to dispatching the invoice.

In one or more embodiments, a further step includes the real-time electronic bill presentment and payment system passing a real time payment status message, associated with the invoice, and received from the given one of the plurality of customers via the given one of the plurality of customer financial institutions, to the given one of the businesses via a corresponding given one of the business financial institutions; the real time payment status message can indicate, for example, payment scheduled for a future date; real time payment status message indicates real time payment via a real-time payment infrastructure such as a DSS (designated settlement system)—the automated clearing house real time payment 9031 is a non-limiting example; real time payment via a special payment card payment transaction which adds funds to a payment card account of the given one of the businesses (see, e.g., discussion of "SEND" and "MONEY-SEND" elsewhere herein); and/or that payment via non-real-time electronic funds transfer has been initiated (e.g., funds moved through traditional ACH transfer, but with real-time messaging from the customer's bank 9021-N through BPP provider 9011 to the app 845/9007 of the small business 9001). Refer generally to discussion elsewhere herein of four exemplary ways to pay the business in real time.

In some embodiments, the real-time electronic bill presentment and payment system passes a real time payment status message, not associated with an invoice, and received from a given one of the plurality of customers via a corresponding given one of the plurality of customer financial institutions, to a given one of the businesses via a corresponding given one of the business financial institutions, responsive to the given one of the plurality of customers locating the given one of the businesses in the populated biller directory. Refer to the discussion elsewhere herein indicating that in some embodiments, the small business does not even have to create an invoice—a customer 9023 can go into a suitable application and look the small business up. For example, the customer can look up a small business (the small business would have already registered itself in the directory). The customer can then make a payment to the small business—there need not be a preceding request or invoice.

Referring now also to FIG. 5, discussed in greater detail below, in another aspect, an apparatus includes a memory (e.g., RAM of 530); at least one processor 520, coupled to the memory; and a non-transitory computer readable medium (e.g., hard drive of 530) including computer executable instructions which when loaded into the memory configure the at least one processor to instantiate a legacy bill presentment and payment system 9013, a real-time platform 9015, and an application programming interface (symbolized by arrow 9041). The legacy bill presentment and payment system and the real-time platform cooperatively form a real-time electronic bill presentment and payment system of a bill presentment and payment system provider. The apparatus then carries out or otherwise facilitates any one, some, or all of the method steps herein (e.g., from the perspective of entity 9011).

In still another aspect, in another exemplary method (e.g. from the perspective of entity 9003 or 9035), at least one of a business financial institution 9003 and an accounting software provider 9035 accesses a real-time electronic bill presentment and payment system (e.g. legacy batch BPPS 9013 with real-time platform 9015) of a bill presentment and payment system provider 9011 via an application programming interface (symbolized by arrow 9041). the at least one of a business financial institution and an accounting software provider provides a real-time electronic bill presentment and payment mobile application 845, 9007 to a business (e.g., small business 9001), based on input from the bill presentment and payment system provider 9011 (see exemplary discussion elsewhere herein of white label application).

Said at least one of a business financial institution and an accounting software provider provides, to the real-time electronic bill presentment and payment system, via the application programming interface, registration information (see discussion of "profile" elsewhere herein, for example) provided to the at least one of a business financial institution and an accounting software provider by the business via the real-time electronic bill presentment and payment mobile application. This enables the real-time electronic bill presentment and payment system to populate a biller directory database (e.g. 9017 and/or database within 9013) in the real-time electronic bill presentment and payment system with the registration information provided to the at least one of a business financial institution and an accounting software provider by the business via the real-time electronic bill presentment and payment mobile application. Advantageously, no action, other than the input, is required by the bill presentment and payment system provider for the at least one of a business financial institution and an accounting software provider to obtain the registration information from the business via the real-time electronic bill presentment and payment mobile application.

In one or more embodiments, the real-time electronic bill presentment and payment mobile application provided in the providing step is configured to: run on a computing device (e.g. 800 or 500) of the business; store invoices on the mobile device in case of a loss of network connectivity between (i) the at least one of a business financial institution and an accounting software provider and (ii) the computing device; display a ready-to-be-sent status for the stored invoices (see FIG. 26); and send the stored invoices upon restoration of the network connectivity. The at least one of a business financial institution and an accounting software provider receives the stored invoices upon the restoration of the network connectivity.

Note that in addition to buffering of invoices as in FIG. 26, consumer activity buffering on a consumer's computing device, such as a mobile device, can also be provided in case the consumer's device loses network connectivity.

In one or more embodiments, the real-time electronic bill presentment and payment mobile application provided in the providing step is further configured to display real-time cash position updates (see, e.g., FIG. 14). A further step includes the at least one of a business financial institution and an accounting software provider providing the real-time cash position updates to the computing device for display thereon.

In one or more embodiments, the at least one of a business financial institution and an accounting software provider obtains an invoice provided by the business; the invoice including an identification of a customer for whom the invoice is intended. The at least one of a business financial institution and an accounting software provider sends, to the real-time electronic bill presentment and payment system, the invoice. the at least one of a business financial institution and an accounting software provider obtains a real time payment status message, associated with the invoice, and received from the customer via a customer financial institution and the real-time electronic bill presentment and payment system; the at least one of a business financial institution and an accounting software provider sends, to the computing device, via the application, the real time payment status message.

In one or more embodiments, the at least one of a business financial institution and an accounting software provider sends an alert associated with the invoice to the computing device, via a communications channel other than the application (e.g. text/SMS, e-mail, or the like).

The alert indicates, for example, at least one of a size and a risk level of the customer.

In some cases, the at least one of a business financial institution and an accounting software provider generates the alert based on a risk level of the customer and a payment delay associated with the invoice.

Referring again to FIG. 5 (as noted, discussed in greater detail below), in another aspect, an apparatus includes a memory (e.g., RAM of 530); at least one processor 520, coupled to the memory; and a non-transitory computer readable medium (e.g., hard drive of 530) including computer executable instructions which when loaded into the memory configure the at least one processor to carry out or otherwise facilitates any one, some, or all of the method steps herein (e.g., from the perspective of entity 9003 and/or 9035).

As discussed elsewhere herein, embodiments are also directed to various computer program products; one non-limiting example is a computer program product directed to the functionality of app 845/9007.

System and Article of Manufacture Details

Embodiments of the invention can employ hardware and/or hardware and software aspects. Software includes but is not limited to firmware, resident software, microcode, etc.

Software might be employed, for example, in connection with one or more modules to implement at least a portion of one or more of the elements of the devices, systems and/or flows of FIG. 12; a terminal 122, 124, 125, 126; a reader 132; a host, server, and/or processing center 140, 142, 144 (optionally with data warehouse 154) of a merchant, issuer, acquirer, processor, other third party, or operator of a network 2008 and/or system 9011; and the like. Firmware might be employed, for example, in connection with payment devices such as cards 102, 112, as well as reader 132 and mobile devices 800.

FIG. 5 is a block diagram of a system 500 that can implement part or all of one or more aspects or processes of the invention. As shown in FIG. 5, memory 530 configures the processor 520 (which could correspond, e.g., to processor portions 106, 116, 130; a processor of a terminal or a reader 132; processors of remote hosts in centers 140, 142, 144; processors of a merchant, issuer, acquirer, processor, other third party, or operator of a network 2008 and/or devices, systems and/or flows of FIG. 12; and the like); to implement one or more aspects of the methods, steps, and functions disclosed herein (collectively, shown as process 580 in FIG. 5). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112).

It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an application specific integrated circuit (ASIC) or field programmable gate array (FPGA) rather than using firmware. Display 540 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing aspects of network 2008 and/or systems 9011, and/or devices, systems and/or flows of FIG. 12; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140, 142, 144, 2004, 2006, 2008, 2010; a computer implementing aspects of network 2008 and/or systems 9011, and/or devices, systems and/or flows of FIG. 12; hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program product comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 5) running a server program. It will be understood that such a physical server may or may not include a display, keyboard, or other input/output components. A "host" includes a physical data processing system (for example, system 500 as shown in FIG. 5) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures; e.g. FIG. 12. The method steps can be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers, mobile devices, or personal computers, located at one or more of the entities in the figures, as well as within the payment network 2008, system 9011 and/or devices, systems and/or flows of FIG. 12. Such computers can be interconnected, for example, by one or more of payment network 2008, another VPN, the Internet, a local area and/or wide area network (LAN and/or WAN), via an EDI layer, a wireless telephony network, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, NY, US; SAS® software available from SAS Institute, Inc., Cary, NC, US), spreadsheets (e.g., MICROSOFT EXCEL® software available from Microsoft Corporation, Redmond, WA, US), and the like. The computers can be programmed to implement the logic and/or data flow depicted in the figures. In some instances, messaging and the like may be in accordance with the International Organization for Standardization (ISO) Specification 8583 Financial transaction card originated messages—Interchange message specifications and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   at least one of a business financial institution and an accounting software provider accessing a real-time electronic bill presentment and payment system of a bill presentment and payment system provider via an application programming interface;
   said at least one of a business financial institution and an accounting software provider providing a real-time electronic bill presentment and payment mobile application to a business, based on input from said bill presentment and payment system provider; and
   said at least one of a business financial institution and an accounting software provider providing, to said real-time electronic bill presentment and payment system, via said application programming interface, registration information provided to said at least one of a business financial institution and an accounting software provider by said business via said real-time electronic bill presentment and payment mobile application, to enable said real-time electronic bill presentment and payment system to populate a biller directory database in said real-time electronic bill presentment and payment system with said registration information provided to said at least one of a business financial institution and an accounting software provider by said business via said real-time electronic bill presentment and payment mobile application;
   wherein no action, other than said input, is required by said bill presentment and payment system provider for said at least one of a business financial institution and an accounting software provider to obtain said registration information from said business via said real-time electronic bill presentment and payment mobile application.

2. The method of claim 1, wherein:
   said real-time electronic bill presentment and payment mobile application provided in said providing step is configured to:
      run on a computing device of said business;
      store invoices on said computing device in case of a loss of network connectivity between (i) said at least one of a business financial institution and an accounting software provider and (ii) said computing device;
      display a ready-to-be-sent status for said stored invoices; and send said stored invoices upon restoration of said network connectivity;

further comprising said at least one of a business financial institution and an accounting software provider receiving said stored invoices upon said restoration of said network connectivity.

3. The method of claim 2, wherein:

said real-time electronic bill presentment and payment mobile application provided in said providing step is further configured to display real-time cash position updates;

further comprising said at least one of a business financial institution and an accounting software provider providing said real-time cash position updates to said computing device for display thereon.

4. The method of claim 1, further comprising:

obtaining, at said at least one of a business financial institution and an accounting software provider, an invoice provided by said business, said invoice including an identification of a customer for whom said invoice is intended;

sending, from said at least one of a business financial institution and an accounting software provider, to said real-time electronic bill presentment and payment system, said invoice;

obtaining, at said at least one of a business financial institution and an accounting software provider, a real time payment status message, associated with said invoice, and received from said customer via a customer financial institution and said real-time electronic bill presentment and payment system;

sending, from said at least one of a business financial institution and an accounting software provider, to said computing device, via said application, said real time payment status message.

5. The method of claim 4, further comprising said at least one of a business financial institution and an accounting software provider sending an alert associated with said invoice to said computing device, via a communications channel other than said application.

6. The method of claim 5, wherein said alert indicates at least one of a size and a risk level of said customer.

7. The method of claim 5, further comprising said at least one of a business financial institution and an accounting software provider generating said alert based on a risk level of said customer and a payment delay associated with said invoice.

* * * * *